(12) United States Patent
Skupin et al.

(10) Patent No.: US 10,986,383 B2
(45) Date of Patent: Apr. 20, 2021

(54) EFFICIENT ADAPTIVE STREAMING

(71) Applicant: Fraunhofer-Gesellschaft zur Foerderung der angewandten Forschung e.V., Munich (DE)

(72) Inventors: Robert Skupin, Berlin (DE); Yago Sánchez De La Fuente, Berlin (DE); Thomas Schierl, Berlin (DE); Cornelius Hellge, Berlin (DE); Karsten Grueneberg, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/999,044

(22) Filed: Aug. 17, 2018

(65) Prior Publication Data
US 2019/0014363 A1 Jan. 10, 2019

Related U.S. Application Data

(63) Continuation of application No. PCT/EP2017/053310, filed on Feb. 14, 2017.

(30) Foreign Application Priority Data

Feb. 16, 2016 (EP) .................................... 16156015

(51) Int. Cl.
*H04N 21/2343* (2011.01)
*H04N 21/2662* (2011.01)
(Continued)

(52) U.S. Cl.
CPC ... *H04N 21/234363* (2013.01); *H04N 19/176* (2014.11); *H04N 19/59* (2014.11);
(Continued)

(58) Field of Classification Search
CPC ....... H04N 21/234363; H04N 21/2343; H04N 21/23439; H04N 21/2662; H04N 21/4384;
(Continued)

(56) References Cited

U.S. PATENT DOCUMENTS

2005/0117641 A1* 6/2005 Xu ..................... H04N 21/2662
375/240.08
2011/0096990 A1 4/2011 Lu et al.
(Continued)

FOREIGN PATENT DOCUMENTS

EP 2547062 A1 1/2013
EP 2723079 A2 4/2014
(Continued)

OTHER PUBLICATIONS

"Outline", 3GPP Draft, URL: http://www.3gpp.org/ftp/tsg_sa/WG4_CODEC/TSGS4_81/Docs/, S4-141120 attachment, 3rd Generation Partnership Project (3GPP), (Oct. 28, 2014), XP050896393, Oct. 28, 2014, 18 pages.
(Continued)

*Primary Examiner* — Matthew K Kwan
(74) *Attorney, Agent, or Firm* — Michael A. Glenn; Perkins Coie LLP

(57) ABSTRACT

Adaptive streaming is rendered more efficiently combinable with the usage of an open GOP structure by configuring a device for retrieving a video such that the same schedules a transition phase before switching from a first video stream to the second video stream, and/or by configuring a device for outputting a video in accordance with the adaptive streaming protocol such that the same supports switching outputting the video in form of a layered video stream or an increased spatial resolution stream. A media scene composed of several channels is made more efficiently streamable spending,
(Continued)

for each channel, a set of representations of the respective channel which differ in a temporal distribution of random access points. By this measure, a client device may schedule the switching between the representations for optimizing fast tune-in and low bitrate variations.

19 Claims, 22 Drawing Sheets

(51) Int. Cl.
*H04N 19/59* (2014.01)
*H04N 19/176* (2014.01)
*H04N 19/61* (2014.01)
*H04N 21/4402* (2011.01)
*H04N 21/845* (2011.01)
*H04N 21/854* (2011.01)
*H04N 21/438* (2011.01)

(52) U.S. Cl.
CPC ......... *H04N 19/61* (2014.11); *H04N 21/2343* (2013.01); *H04N 21/23439* (2013.01); *H04N 21/2662* (2013.01); *H04N 21/4384* (2013.01); *H04N 21/4402* (2013.01); *H04N 21/8456* (2013.01); *H04N 21/85406* (2013.01)

(58) Field of Classification Search
CPC ........... H04N 21/4402; H04N 21/8456; H04N 21/85406; H04N 19/176; H04N 19/59; H04N 19/61
USPC .................................................. 375/240.01
See application file for complete search history.

(56) References Cited

U.S. PATENT DOCUMENTS

| 2013/0016791 | A1* | 1/2013 | Collard ................. H04L 65/607 375/240.25 |
| 2013/0282917 | A1* | 10/2013 | Reznik .................. H04L 65/602 709/231 |
| 2014/0086333 | A1 | 3/2014 | Wang |
| 2015/0358617 | A1 | 12/2015 | Sato |

FOREIGN PATENT DOCUMENTS

| KR | 20150063456 A | 6/2015 |
| WO | 2013163224 A1 | 10/2013 |
| WO | 2014106692 A1 | 7/2014 |
| WO | 2015/004323 A1 | 1/2015 |
| WO | 2016108188 A1 | 7/2016 |

OTHER PUBLICATIONS

Huang, Xuehui et al., "Improved Downstream Rate-Distortion Performance of SHVC in Dash using Sub-layer-selective Interlayer Prediction", 2015 IEEE 17th International Workshop on Multimedia Signal Processing (MMSP), IEEE, (Oct. 19, 2015), doi:10.1109/MMSP.2015.7340848, pp. 1-6, XP032822530, Oct. 19, 2015, pp. 1-6.

Nokia Corporation, "FS_VE_3MS: Additional results for SHVC in 3GP-DASH", URL: http://www.3gpp.org/ftp/tsg_sa/WG4_CODEC/TSGS4_85/Docs/, vol. SA WG4, No. Kobe, Japan; Aug. 24, 2015-Aug. 28, 2015, (Aug. 26, 2015), 3GPP Draft; S4-151091, 3rd Generation Partnership Project (3GPP), (Aug. 26, 2015), XP051036811, Aug. 24-48, 2015, 6 pages.

Sullivan, Gary J. et al., "Overview of the High Efficiency Video Coding (HEVC) Standard", IEEE Transactions on Circuits and Systems for Video Technology, (Dec. 1, 2012), vol. 22, No. 12, doi:10.1109/TCSVT.2012.2221191, ISSN 1051-8215, XP055284729, Dec. 1, 2012, pp. 1649-1668.

Yan, Ye et al., "Seamless switching of H.265/HEVC-coded dash representations with open GOP prediction structure", 2015 IEEE International Conference on Image Processing (ICIP), 2015, pp. 4121-4125.

* cited by examiner

EFFICIENT ADAPTIVE STREAMING

CROSS-REFERENCE TO RELATED APPLICATIONS

This application is a continuation of copending International Application No. PCT/EP2017/053310, filed Feb. 14, 2017, which is incorporated herein in its entirety by this reference thereto, which claims priority from European Application No. 16 156 015.6, filed Feb. 16, 2016, which is also incorporated herein in its entirety by this reference thereto.

The present application is concerned with adaptive streaming such as using DASH.

BACKGROUND OF THE INVENTION

Using adaptive streaming, a media data stream is provided from server to client in temporal segments. Depending on the application, the server may offer to the client a media at different bit rates. That is, sequences of temporal segments for different versions of the media content are available to the client for download and, during media streaming, a switching between the different versions is feasible. Accordingly, the sequence of temporal segments retrieved by the client from the server comprises, in an interleaved manner, ones stemming from a first version and ones stemming from another version. Problems may occur, however, if one would like to take advantage of the more efficient open GOP structure for encoding the media content as, in this case, reference pictures, in particular the leading pictures that miss references when decoding the stream is started at their associated random access point (e.g. random access skip leading pictures—RASL pictures in HEVC), may get lost in such situations. Using a closed GOP structure for coding the media content does not cause these problems, but ends up into a lower coding/compression efficiency.

Other aspects for which there is a general interest in achieving improvements in adaptive streaming, pertain streaming parameters such as the frequency of requests from the client to the server for requesting the issuance of a next temporal segment, a mean tune-in latency, i.e., the mean time at which a client is enabled to gain access to a certain media content, which latency should be minimalized, and an avoidance for bit rate peaks as such bit rate peaks in streaming media content involves a larger input buffer at the client for compensating the bit rate variations.

SUMMARY

An embodiment may have a device for outputting, using an adaptively streaming protocol, a video to a client, the device supporting switching between, at least, outputting the video in form of a layered video stream; and outputting the video in form of an increased spatial resolution video stream encoded using an open GOP structure and having encoded thereinto the video at a second spatial resolution and at a second quality, the layered video stream having: a first layer having encoded thereinto the video at a first spatial resolution and a second layer having encoded thereinto the video at the second spatial resolution and a first quality lower than the second quality and using inter-layer prediction from the first to the second layer by way of inter-layer upsampling, but without prediction residual coding.

Another embodiment may have a device for retrieving, using an adaptively streaming protocol, a video, the device supporting switching between, at least, retrieving the video in form of a first video stream; and retrieving the video in form of a second video stream, wherein the device is configured to schedule a transition phase before switching from retrieving the video in form of the first video stream to retrieving the video in form of the second video stream.

According to another embodiment, a data structure representing a video, the data structure being conceptualized for a retrieval of the video, using an adaptively streaming protocol, by a client switching between, at least, retrieval at a first spatial resolution and retrieval at a second spatial resolution greater than the first spatial resolution, may have: an increased spatial resolution video stream having encoded therein the video using an open GOP structure at the second spatial resolution and at a second quality, and a layered video stream having a first layer having encoded thereinto the video at the first spatial resolution and a second layer having encoded thereinto the video at the second spatial resolution and a first quality reduced compared to the second quality and using inter-layer prediction from the first to the second layer by way of inter-layer upsampling, but without residual coding.

Another embodiment may have a device for outputting, using an adaptively streaming protocol, a video to a client, the device being configured to offer the video to the client for retrieval in form of, at least, a first video stream; and a second video stream, wherein the device is configured to inform the client on the necessity to schedule a transition phase before switching from retrieving the video in form of the first video stream to retrieving the video in form of the second video stream.

According to another embodiment, a video stream having encoded thereinto a sequence of pictures in such a manner that there is among the sequence of pictures at least one random access dependent picture which directly or indirectly references, by temporal prediction, a, in terms of presentation time order, succeeding random access point picture of the sequence of pictures and a reference picture preceding, in terms of presentation time order and decoding order, the random access point picture, may have: a syntax element indicating a maximum temporal distance between the at least one random access dependent picture and the reference picture directly or indirectly referenced by the at least one random access dependent picture.

Another embodiment may have a video encoder configured to encode a sequence of pictures into a video stream in such a manner that there is among the sequence of pictures at least one random access dependent picture which directly or indirectly references, by temporal prediction, a, in terms of presentation time order, succeeding random access point picture of the sequence of pictures and a reference picture preceding, in terms of presentation time order and decoding order, the random access point picture, and insert a syntax element into the data stream indicating a guaranteed maximum temporal distance between the at least one random access dependent picture reference picture and the reference picture directly or indirectly referenced by the at least one random access dependent picture.

According to another embodiment, a method for outputting, using an adaptively streaming protocol, a video to a client, may have the step of: switching between, at least, outputting the video in form of a layered video stream; and outputting the video in form of an increased spatial resolution video stream encoded using an open GOP structure and having encoded thereinto the video at a second spatial resolution and at a second quality, the layered video stream having a first layer having encoded thereinto the video at a first spatial resolution and a second layer having encoded thereinto the video at the second spatial resolution and a first quality lower than the second quality and using inter-layer prediction from the first to the second layer by way of inter-layer upsampling, but without prediction residual coding.

According to another embodiment, a method for retrieving, using an adaptively streaming protocol, a video, may have the step of: switching between, at least, retrieving the video in form of a first video stream; and retrieving the video in form of a second video stream, wherein the device is configured to schedule a transition phase before switching from retrieving the video in form of the first video stream to retrieving the video in form of the second video stream.

Another embodiment may have a digital storage medium storing an inventive data structure.

According to another embodiment, a method for outputting, using an adaptively streaming protocol, a video to a client, may have the steps of: offering the video to the client for retrieval in form of, at least, a first video stream; and a second video stream, and informing the client on the necessity to schedule a transition phase before switching from retrieving the video in form of the first video stream to retrieving the video in form of the second video stream.

Another embodiment may have a digital storage medium storing an inventive video stream.

According to another embodiment, a video encoding method may have the steps of: encoding a sequence of pictures into a video stream in such a manner that there is among the sequence of pictures at least one random access dependent picture which directly or indirectly references, by temporal prediction, a, in terms of presentation time order, succeeding random access point picture of the sequence of pictures and a reference picture preceding, in terms of presentation time order and decoding order, the random access point picture, and inserting a syntax element into the data stream indicating a guaranteed maximum temporal distance between the at least one random access dependent picture reference picture and the reference picture directly or indirectly referenced by the at least one random access dependent picture.

In accordance with a thought pertaining a first aspect of the present application, adaptive streaming is rendered more efficiently combinable with the usage of an open GOP structure by configuring a device for retrieving a video such that the same schedules a transition phase before switching from a first video stream to the second video stream. The second video stream may be, by this measure, encoded using an open GOP structure since the transition phase may provide enough time to compensate for missing reference pictures of random access dependent pictures such as RASL pictures on the basis of the first video stream.

In accordance with a second thought pertaining the first aspect of the present application, adaptive streaming is rendered more efficiently combinable with the usage of an open GOP structure by configuring a device for outputting a video in accordance with the adaptive streaming protocol such that the same supports switching outputting the video in form of a layered video stream or an increased spatial resolution stream, the layered video stream having a second layer which has encoded thereon the video at the increased spatial resolution using inter-layer prediction without residual coding. By this measure, information for substituting the afore-mentioned missing reference pictures of random access dependent pictures such as RASL pictures is rendered easily available at the client. The second stream, for which the reference pictures for random access dependent pictures are made available by means of using the layered video coded without residual coding, may be a layer of a layered video coded using inter-layer prediction or even a single layered video stream, i.e. a layer coded without inter-layer prediction. For the latter case, it means that inter-layer prediction is only used to make reference pictures for random access dependent pictures available.

In accordance with a second aspect of the present application, a media content such as a video, is made more efficiently streamable via adaptive streaming by allowing same to be represented in a dependent (second) representation which is composed a first set of temporal segments which has encoded thereinto the media content dependent on first portions of a first (reference) representation of the media content temporally corresponding to the first set of temporal segments, and a second set of temporal segments the second representation which has encoded thereinto the media content independent from second portions of the first representation temporally corresponding to the second set of temporal segments so that a successful reconstruction of the media content from the second representation gets along without the second portions the first representation.

In accordance with a third aspect of the present application, a media scene composed of several channels is made more efficiently streamable spending, for each channel, a set of representations of the respective channel which differ in a temporal distribution of random access points. By this measure, a client device may schedule the switching between the representations for optimizing fast tune-in and low bitrate variations.

In accordance with a fourth aspect of the present application, adaptive streaming quality is increased when transitioning between two representations or media streams offered at a server by offering to a client, in addition to the first and second media streams, an auxiliary media stream having encoded thereinto the media content dependent on the first and second media streams. The client may use the same to fade when switching from first to second representation by a fading phase within which the device retrieves the auxiliary media stream along with the first and second media streams and plays-out the auxiliary media stream instead of the second auxiliary stream.

BRIEF DESCRIPTION OF THE DRAWINGS

Embodiments of the present invention will be detailed subsequently referring to the appended drawings, in which:

FIG. 1 shows a diagram illustrating a video data stream having a video encoded therein using an open GOP structure, wherein FIG. 1 shows the pictures of the video data stream in presentation time order;

DETAILED DESCRIPTION OF THE INVENTION

The description of the present application with respect to the figures starts with a first aspect of the present application. Here, the usage of open GOP structures is made available for video streaming using an adaptive streaming protocol at reduced penalties in terms of switching between representations of the video relating to different spatial resolution.

In order to ease the understanding of the embodiments concerning the first aspect described later, open GOP structures are explained before.

Figure 1:
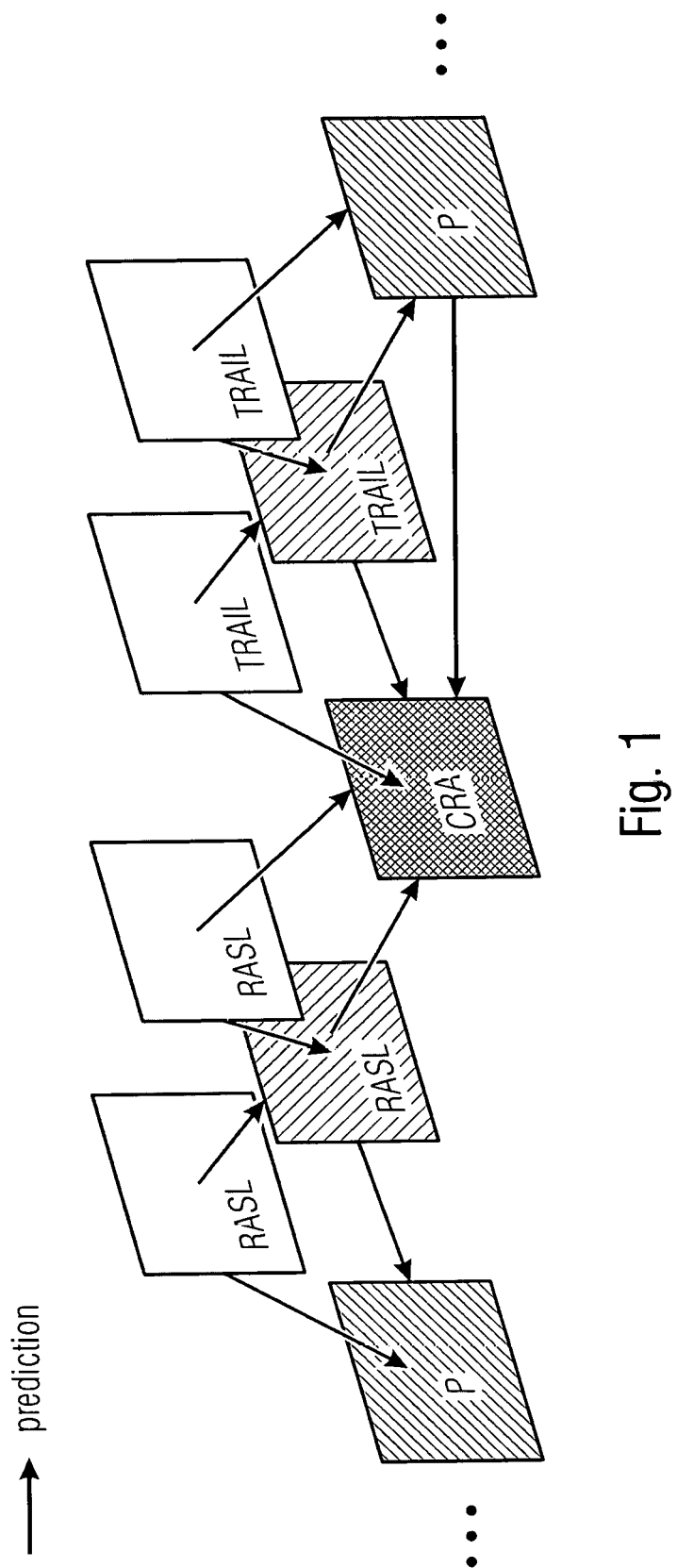

Open GOP structures allow for a more efficient compression of a video than GOP structures at the same Random Access periodicity. As shown in FIG. 1, when random accessing a stream encoding with an open GOP structure, there are certain pictures, denoted RASL in FIG. 1, that are not properly decoded since their references are missing and, therefore, are not reproduced/output/shown.

FIG. 1. shows an open GOP structure in output order using the HEVC nomenclature in indicating the picture types. The Random Access point is here the Clean Random Access (CRA) picture and the Random Access Skip Leading (RASL) pictures are the random access dependent pictures that cannot be shown to the user since, when random accessing at the CRA picture, the reference P picture shown at the figure at the left-hand side is missing.

Figure 2:
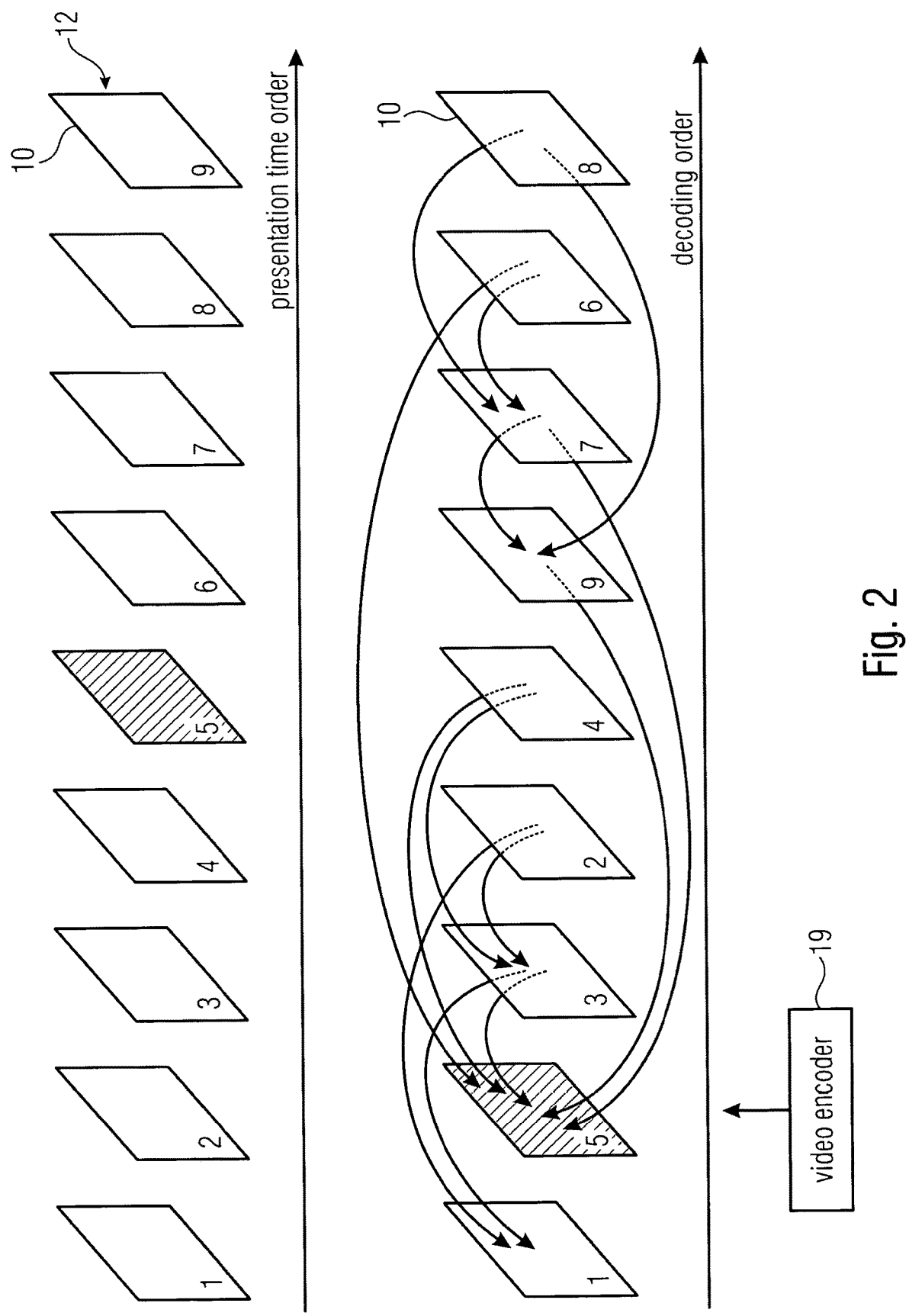
FIG. 2 shows a schematic diagram illustrating a path of pictures of a video data stream having coded therein the pictures using an open GOP structure in presentation time order and, at the bottom half, in decoding order wherein the open GOP structure corresponds to the one of FIG. 1 and merely servers as an example.

In order to render this description easier, reference is made to FIG. 2 which shows, on the top of FIG. 2, a sequence of nine pictures 10 of a video 12 in presentation time order. Pictures 10 are numbered from 1 to 9 along the presentation time order. At the bottom of FIG. 2, FIG. 2 shows pictures 10 in their decoding order at which same are encoded into a data stream. The illustration of FIG. 2 illustrates the case where pictures 10 are encoded into a data stream using the open GOP structure illustrated in FIG. 1. The numbering of the pictures 10 in the bottom half of FIG. 2 shows that the pictures 10 are temporally rearranged, i.e., that the decoding order deviates from the presentation time order.

In particular, FIG. 2 shows that the fifth picture 10 in presentation time order is coded as a random access point picture. That is, the fifth picture in presentation time order or picture number 5, is coded without depending on any picture of another presentation time and preceding in decoding order. As shown in FIG. 2, pictures number 2 to number 4 are coded in a manner directly or indirectly referencing, by temporal prediction, picture number 5, i.e., the random access point picture and another picture, namely here picture number 1, which precedes the random access point picture both in terms of presentation time order as well as decoding order. For example, picture number 3 directly references, by temporal prediction, picture number 5 and picture number 1. That is, picture number 3 is temporally predicted by way of motion compensated prediction, for instance, on the basis of picture number 5 and number 1. Picture number 4 does not directly reference, by temporal prediction, picture 1, but indirectly, namely via picture number 3. That is, the set of pictures numbers 2, 3 and 4 have in common that: 1) they directly or indirectly reference, by temporal prediction, a random access point picture, here exemplary picture number 5 and, 2) directly or indirectly reference, by temporal prediction, a reference picture preceding, in terms of presentation time order and decoding order, the directly or indirectly referenced random access point picture, in FIG. 2 exemplary reference picture number 1. This set of pictures is liable to be skipped if random access point picture number 5 is used for random accessing the video data stream into which video 10 is encoded using an open GOP structure since the reference picture number 1 for this set of pictures numbers 2, 3 and 4 would be missing as it lies, in decoding order, upstream the random access point picture number 5.

Besides using open GOP structure for typical broadcast scenarios, where skipping some of the pictures such as RASL pictures when random accessing, for instance during channel switching between programs, is acceptable, open GOP structures have shown to be valuable for adaptive streaming such as DASH where switching to one or another stream with a different quality is done aligned with random access point pictures such as CRAs without skipping pictures. As long as the resolution is the same and the streams are authored carefully, it is possible to concatenate or stitch two streams with different qualities and obtain a specification conformant bit stream that can form a single video sequence from the view point of the video codec specification.

Figure 3:
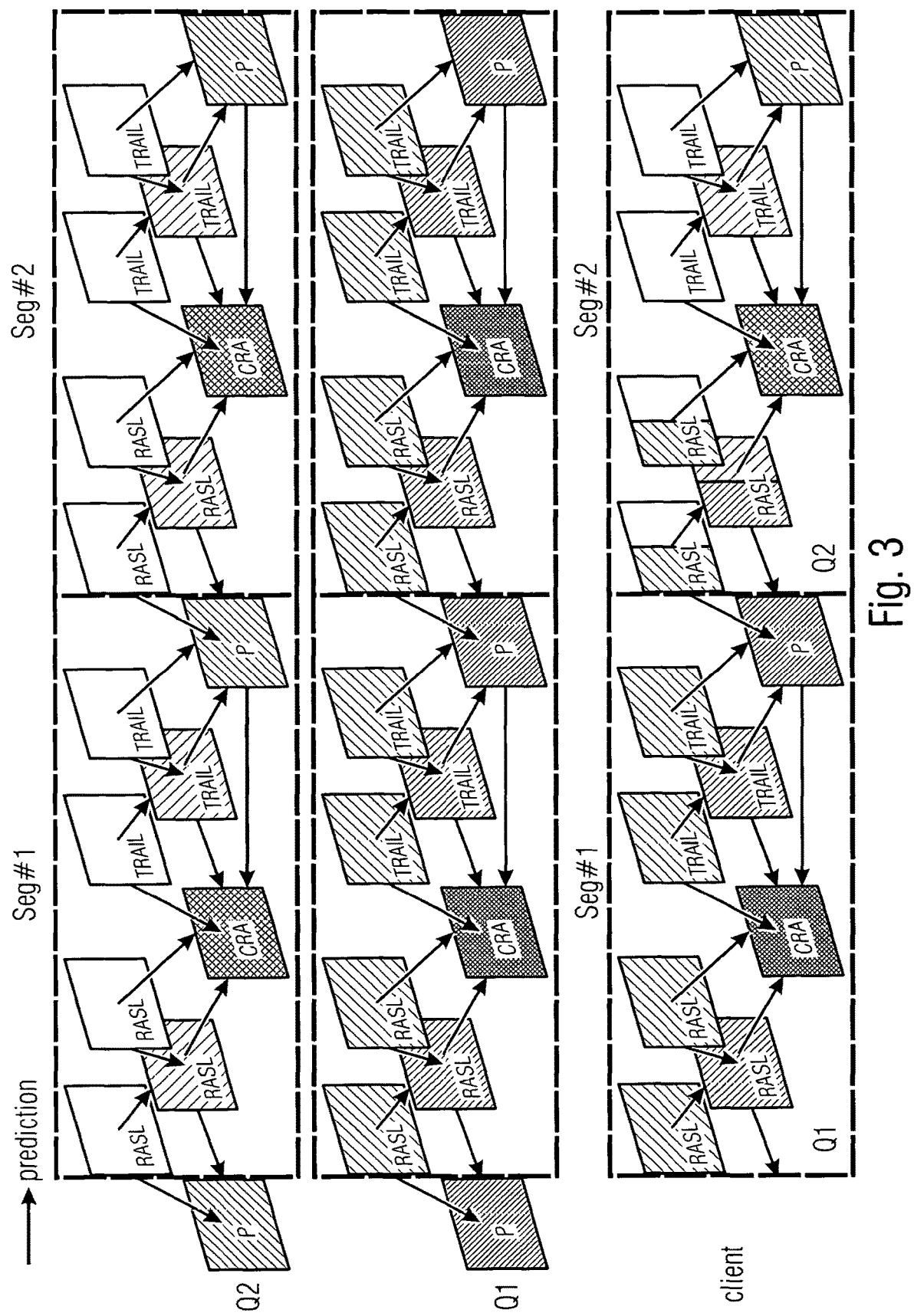
FIG. 3 shows a schematic diagram illustrating two separately/independently coded video data streams, temporally subdivided into segments for adaptive streaming, at the top half, and at the bottom half the stitched data stream arriving at a client at a transition from lower quality to higher quality.

The latter circumstance is illustrated with respect to FIG. 3 which shows at the top half thereof, two representations Q1 and Q2 of a video and, in particular, two consecutive temporal segments Seg #1 and Seg #2 thereof. At the bottom half of FIG. 3, those temporal segments are illustrated in concatenation which are actually retrieved by a client from the server. As illustrated in FIG. 3, in the example of FIG. 3, the client has chosen to retrieve temporal segment Seg #1 from the representation Q1 and the subsequent temporal segment Seg #2 from representation Q2. In other words, FIG. 3 illustrates an example where a client downloads a first segment Seg #1 at a quality Q1 followed by a second temporal segment Seg #2 at quality Q2.

As was the case with FIGS. 1 and 2, FIG. 3 illustrates the interdependencies among the pictures shown by way of arrows which point from the picture predictively coded to the respective reference picture referenced, here by temporal prediction, by the respective picture. Each segment starts, in decoding order, with a CRA picture, i.e., a random access point picture but, in the presentation time order at which the pictures are shown to be ordered in FIG. 3, this random access point picture of each segment is preceded by RASL pictures. The explanation of this circumstance has been explained above with respect to FIG. 2. By switching from quality Q1 to quality Q2, the reference pictures for the RASL pictures of the second segment of data stream Q2 did not get lost: within stream Q2, the RASL pictures of the second segment of stream Q2 reference picture P of the first segment of stream Q2, and within the stitched data stream where the second segment of stream Q2 follows the first segment of stream Q1, these RASL pictures refer to the temporally aligned low quality picture P of the first segment of quality Q1 as a substitute. FIG. 3 illustrates the effect of this reference picture change. In particular, FIG. 3 depicts the pictures of representation Q2 in a shaded form, whereas pictures of representation Q1 are depicted without shading. In the stitched or concatenated stream where the segment of quality Q2 follows the first segment of quality Q1, the RASL pictures of the second segment of quality Q2 are depicted in one half without shading and the other half with shading, thereby indicating that the result of decoding these RASL pictures is neither the result of the corresponding RASL pictures when decoding the continuous stream of Q2 or Q1. However, besides being specification conformant, if they are authored properly, the quality degradation with respect to Q2 is not significant. This can already be signaled with the attribute @mediaStreamStructure in the Media Presentation Description (MPD) for DASH, i.e., within the manifest file.

A problem arises when the different qualities Q1 and Q2 do not have the same resolution, since reference pictures needed for open GOP switching are not present at the proper resolution. This means that it is not possible to perform open GOP switching with resolution change with the current existing single layer codecs such as HEVC, for example. For such a purpose, a layered codec such as SHVC might be used.

In SHVC, when upswitching the decoding process from a lower to a higher layer, RASL pictures are automatically marked as non-output pictures. RASL pictures can be decoded after using the specified process for unavailable reference pictures. However, the decoding result will be visually impaired and the specification notes that, as these pictures do not influence following non-RASL pictures, the RASL pictures can be dropped at all resulting occasions in the lower layer pictures being output.

The subsequently explained embodiments generally follow two options. The first one provides enough information for the user so that the RASL pictures of a higher quality are shown at the highest quality instead of showing the lower quality for the case of using Open GOP structures for a layered codec using inter-layer prediction over the whole time (having all layers present constantly). Another option, however, is provided for the case that it is desirable to have independent layer bitstreams due to the higher compression efficiency, but still using inter-layer prediction for upswitching.

Figure 4:
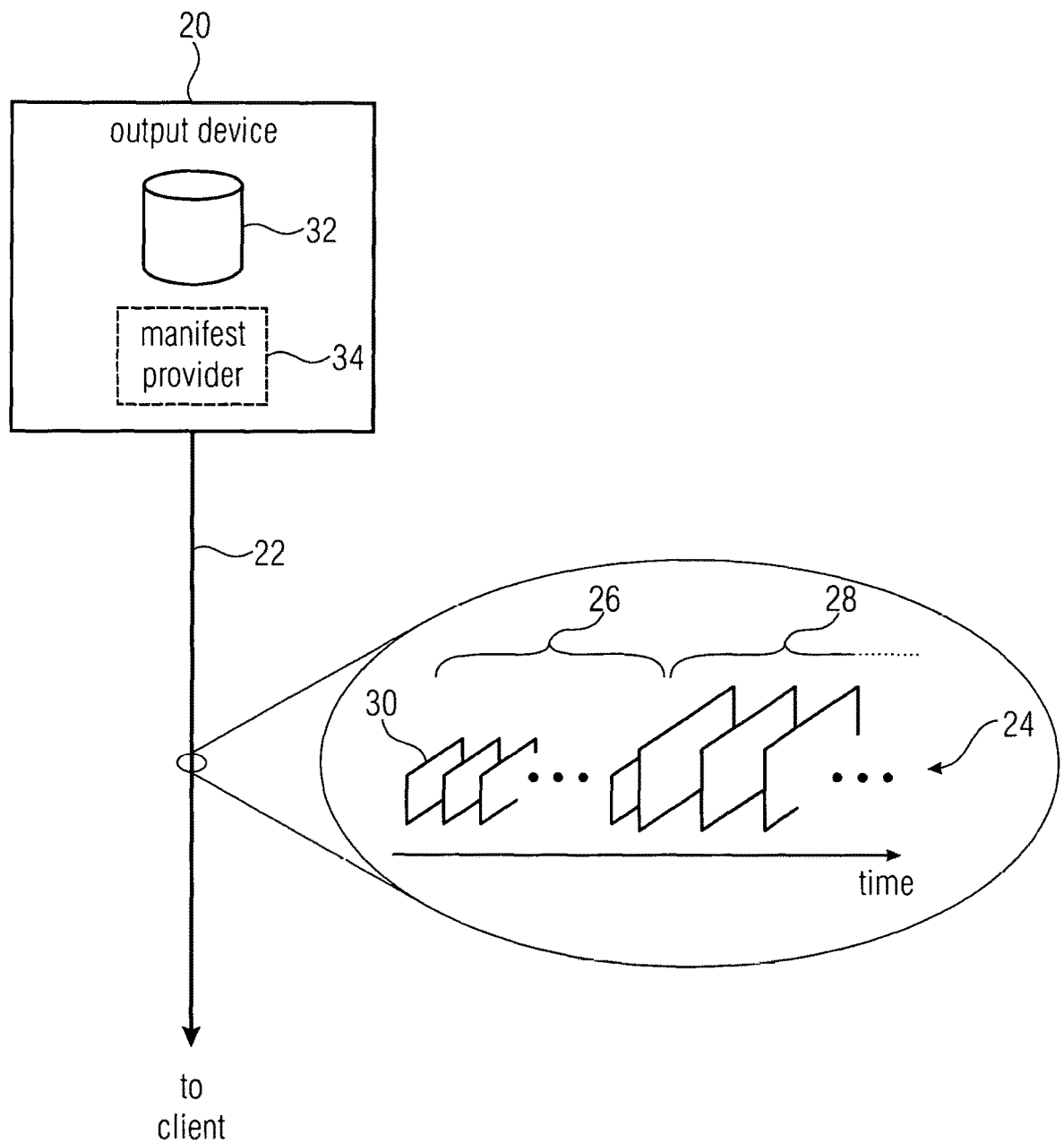
FIG. 4 shows a schematic diagram illustrating an output device in accordance with an embodiment concerning the first aspect of the present application.

In order to ease the understanding of the following more detailed description of the various embodiments concerning the first aspect of the present application, FIG. 4 shows a device for outputting, using an adaptive streaming protocol, a video to a client. The device is denoted as output device in FIG. 4 and indicated using reference sign 20. The output device 20 acts, accordingly, as a streaming server and the adaptive streaming protocol used by device 20 may be DASH or any other adaptive streaming protocol. The device 20 may be implemented in the form of hardware, firmware or software. When implemented in hardware, device 20 may, for instance, be an integrated circuit. If implemented in firmware, device 20 may be an FPGA and, if implemented in software, device 20 may comprise one or more processes programmed by an appropriate computer program.

The device 20 supports switching between, at least, operating the video at a first spatial resolution and outputting the video at a second spatial resolution. That is, the stream 22 output by output device 20 to the client may represent, or have encoded therein, the video 24 at a spatial resolution which varies in time and switches, for instance, between a first spatial resolution and a second spatial resolution which is greater than the first spatial resolution. The "spatial resolution" is, for instance, measured in samples per picture. FIG. 4, for instance, illustrates that output device 20 outputs the video 24 away of stream 22 at a first spatial resolution during a temporal interval 26 and at a second spatial resolution within a temporal interval 28. Within temporal interval 26, stream 22 represents the pictures 30 of video 24 at the first spatial resolution, and during temporal interval 28, stream 22 represents the pictures 30 at the second spatial resolution. The scene section captured by pictures 30 during temporal intervals 26 and 28 may be the same with merely the sample pitch at which pictures 30 spatially sample the scene differing between temporal intervals 26 and 28, or they may show differently sized sections of the same scene in accordance with an alternative embodiment, or a combination thereof.

The fact that output device 20 supports the switching between outputting the video 24 at the first spatial resolution and outputting the video at the second spatial resolution may, for instance, manifest itself in the ability of the client, an embodiment for which is described later, to retrieve from output device 20 the video 24 at the different spatial resolutions by requesting particular representations to the output device 20. As explained later on, output device 20 may, for instance, be a combination of a storage 32 storing an appropriately conceptualized data structure on the one hand and a manifest provider 34 on the other hand. Manifest provider 34 may, for instance, provide the client with a manifest which describes as to how a client may access storage 32 by respective requests. In doing so, the client, on the basis of the manifest, select between temporal segments having encoded therein to the video at the first spatial resolution and temporal segments having encoded therein to the video at the second spatial resolution. Details in this regard are set out below.

Figure 5:
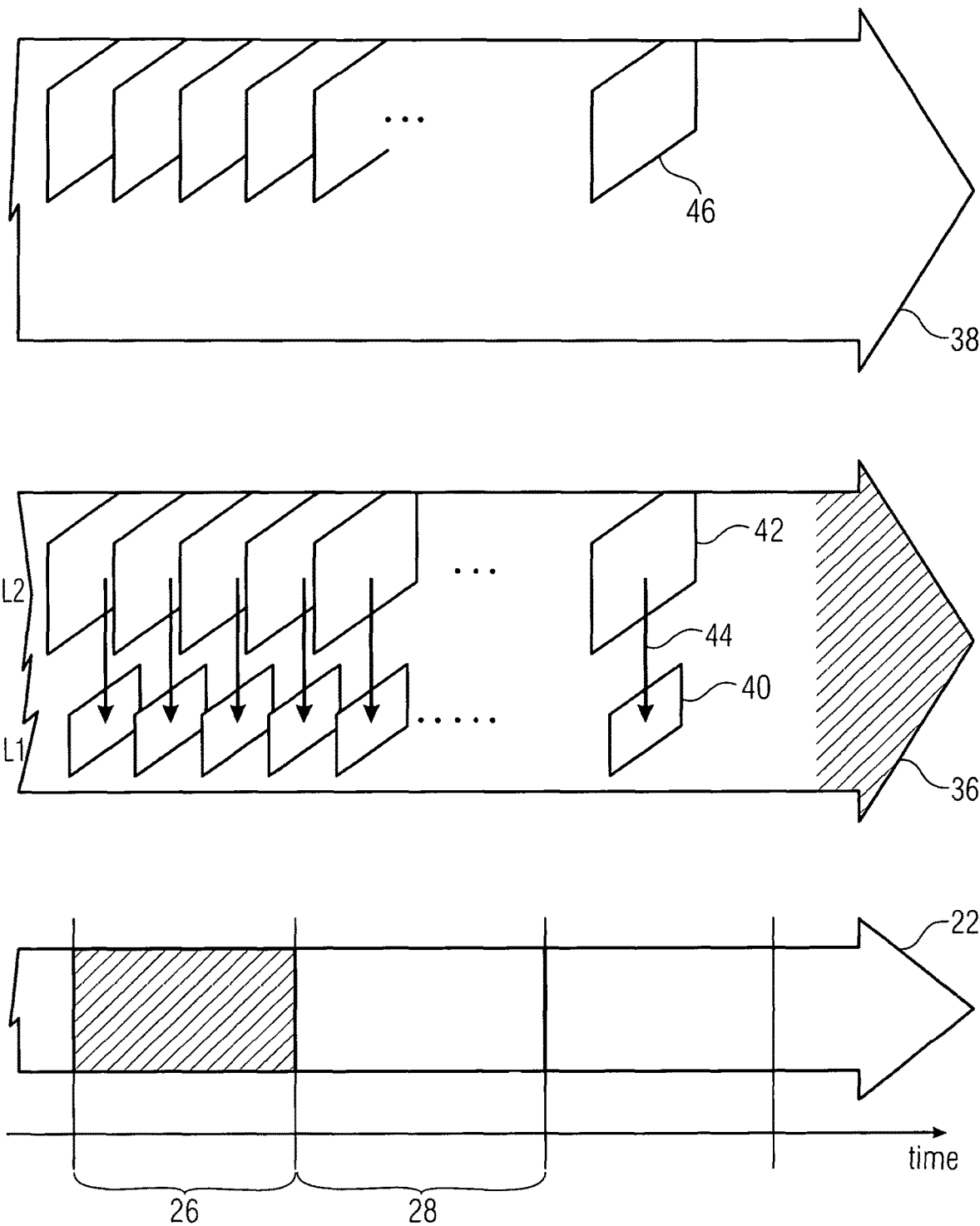
FIG. 5 shows a schematic diagram illustrating a layered video stream and an increased spatial resolution video stream used by the output device of FIG. 4 in accordance with an embodiment.

FIG. 5 illustrates as to how output device 20 enables the usage of open GOP structures for representing and encoding the video 24 at the increased spatial resolution while, nevertheless, avoiding the loss of random access dependent pictures as presented with respect to FIG. 2 in case of switching between the spatial representations. In particular, FIG. 5 illustrates that output device 20 switches, in time, between outputting the video in form of a layered video stream 36 and an increased spatial resolution video stream 38. The details regarding these streams are described further below. That is, the stream 22 output by output device 20 changes between temporal intervals 26 where the output stream 22 is the layered video stream 36 and temporal phases 28 where the output stream 22 is the increased spatial resolution video stream 38. For example, the layered video stream 36 output during interval 26 represents the video during interval 26 and is concatenated or stitched with the increased spatial resolution video stream 38 which represents or has encoded therein the video at the, for example, temporally succeeding interval 28.

The layered video stream 36 comprises, as shown in FIG. 5, a first layer L1 having encoded therein the video at a first spatial resolution. In FIG. 5, the pictures of the video as they are encoded into layer L1 are denoted by reference sign 40. The layer video stream 36 comprises, however, also a second layer L2 having encoded therein the video at the second spatial resolution. The pictures of the second layer L2 are depicted in FIG. 5 using reference sign 42. The way the video 24 is coded into layers L1 and L2 is, however, different. As will be described later on, temporal prediction might, for example, be used to encode pictures 40 into layer L1. For example, a closed GOP structure might be used. The pictures 42 of the second layer, however, are encoded into layer L2 using inter-layer prediction from the first layer L1 to the second layer L2 by inter-layer upsampling but without residual coding. The inter-layer upsampling is illustrated in FIG. 5 using vertical arrows 44, thereby illustrating that each picture 42 is purely inter-layer predicted on the basis of the temporally aligned picture 40 of layer L1. For example, the whole picture content of pictures 42 is obtained by upsampling from the corresponding portion of pictures 40. It is to be emphasized that this "coding" of pictures 42 comes at very low bitrate costs as no residual data has to be conveyed for layer L2 and the inter-layer prediction mode may be signaled for pictures 42, for example, at a coarsest granularity feasible.

The increased spatial resolution video stream 38 has encoded therein the video at the second spatial resolution using an open GOP structure. That is, the pictures 46 of the video 24 as they are encoded into the increased spatial resolution video stream 38 are of the second spatial resolution and among these pictures there are random access point pictures such as picture number 5 shown in FIG. 2 and random access dependent pictures such as pictures number 2, 3 and 4 in FIG. 2. Although FIG. 5 illustrates the case that layer L1, layer L2 and increased spatial resolution video stream 38 have, for each of the pictures, corresponding temporally aligned pictures in the respective other ones, it should be noted that this does not have to be the case in accordance with an alternative embodiment. In order to illustrate as to how the mode of operation of the output device 20 enables the usage of the open GOP structure for forming the increased spatial resolution video stream 38 without loss of random access dependent pictures of this stream, the description of the output device 20 shall be briefly interrupted by a description of a corresponding client device shown in FIG. 6.

Figure 6:
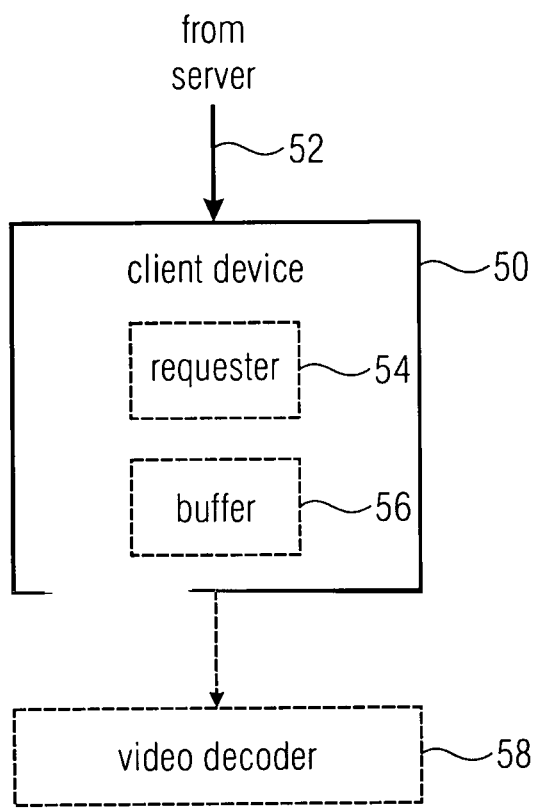
FIG. 6 shows a schematic diagram illustrating a client device in accordance with an embodiment concerning the first aspect of the present application.

FIG. 6 shows a device for retrieving, using an adaptive streaming protocol, a video from a server such as the output device of FIG. 4. The device of FIG. 6 is denoted as client device 50 and may, as was the case with respect to the output device 20, be implemented in hardware, firmware or software. That is, device 50 may be an integrated circuit, an appropriately programmed FPGA or one or more processes appropriately programmed by an appropriate computer program. The client device 50 supports switching between retrieving a video at the first spatial resolution and retrieving the video at the second spatial resolution. To this end, client device 50 retrieves a stream 52 of temporal segments from the server which are selected, per temporal segment, out of different versions of the video or different streams representing the video at different bit rates. For example, stream 52 may be stream 22 of FIGS. 4 and 5, with client device 50 switching between retrieving the video via layered video stream 36 and increased spatial resolution video stream 38 corresponding to a higher bit rate than the layered video stream 36. Internally, client device 50 may comprise a requester 54 responsible for requesting, for example, the aforementioned manifest from the server and sending requests to the server for fetching the temporal segments of the streams offered by the server, such as temporal segments of streams 36 and 38 between which requester 54 switches in order to, for example, avoid buffer over or under flow. For example, client device 50 also comprises a buffer 56 for buffering the inbound temporal segments fetched by requester 54 before they are subject to decoding by forwarding the buffered temporal segment to a video decoder. The video decoder may be part of the client device 50 or may be external thereto. FIG. 6 illustrates the video decoder 58 as being external to the client device 50.

Device 50, thus, receives stream 52 from server by requesting temporal segments of different streams having encoded therein the video at different bit rates and outputs or forwards stream 52 to video decoder 58, thereby retrieving the video at varying spatial resolution.

In doing so, device 50 is configured to, in a transition phase between retrieving a first portion of the video and a first spatial resolution and retrieving a third portion of the video at the second spatial resolution, retrieve a second portion of the video, subsequent to the first and preceding the third portion, at the second spatial resolution by use of up-sampling from the first spatial resolution to the second spatial resolution.

Figure 7:
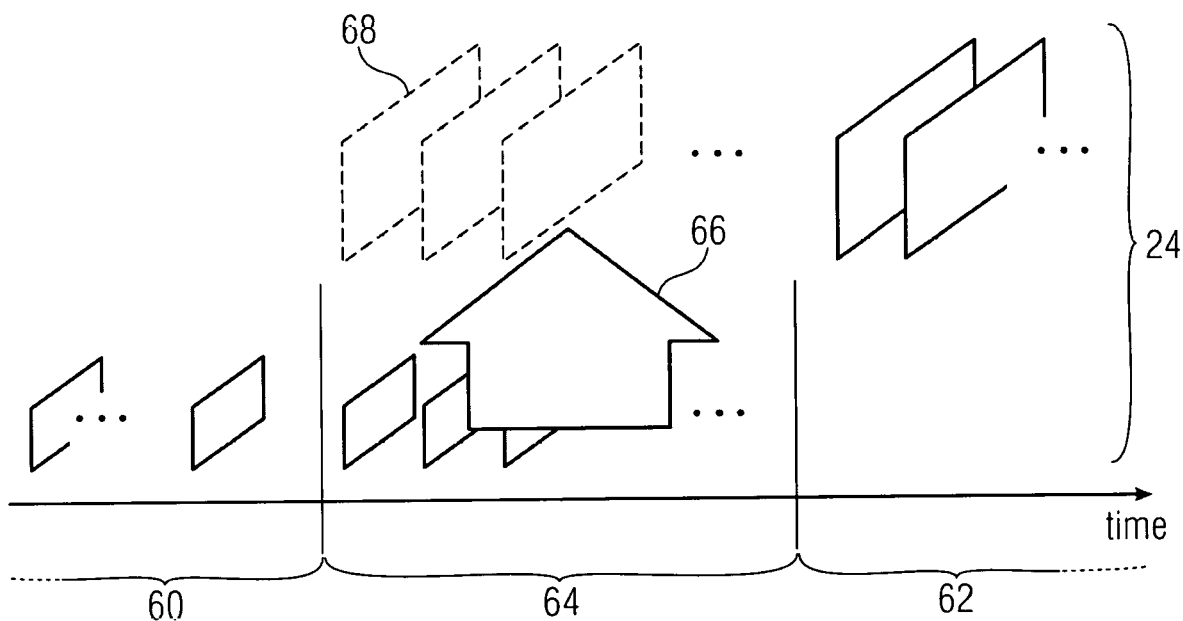
FIG. 7 shows a schematic diagram illustrating the mode of operation of the client device of FIG. 6 with respect to inserting a transition phase when switching from lower spatial resolution to increased spatial resolution in accordance with an embodiment.

In order to illustrate the latter circumstance and as to how device 50 enables the usage of open GOP structure for encoding the video into stream 52 at the second spatial resolution without loss of random access dependent pictures, reference is made to FIG. 7. As FIG. 7 illustrates, client device 50 retrieves within a first temporal portion 60 the video 24 at a first spatial resolution and within a third temporal portion 62 at the second, increased spatial resolution. FIG. 7 illustrates this by depicting the pictures of video 24 at different sizes. That is, within the temporal portion of phase 60, client device 50 retrieves temporal segments of a first stream offered, or rendered available for output, at the server and within the third temporal portion 62 or phase, client device 50 retrieves temporal segments of another stream offered, or rendered available for download, at the server. In between, there is the second temporal portion 64, i.e., preceding temporal portion 62 and succeeding temporal portion 60. Within this temporal portion, client device 50 obtains substitutes for pictures of the second increased spatial resolution by way of upsampling from the first to the second spatial resolution as illustrated by arrow 66. By this measure, client device 50 obtains substitutes or supplemental estimates 68 for pictures of the second spatial resolution, i.e., substitute pictures 68. Among these substitute pictures 68, some of which may be used as substitutes for reference pictures of random access dependent pictures of the random access dependent pictures of the video 24 within temporal portion 62. That is, the representation downloaded by client device 50 during temporal phase 62 may be encoded using open GOP structure and, nevertheless, the random access dependent pictures may be prevented from being lost.

Figure 8:
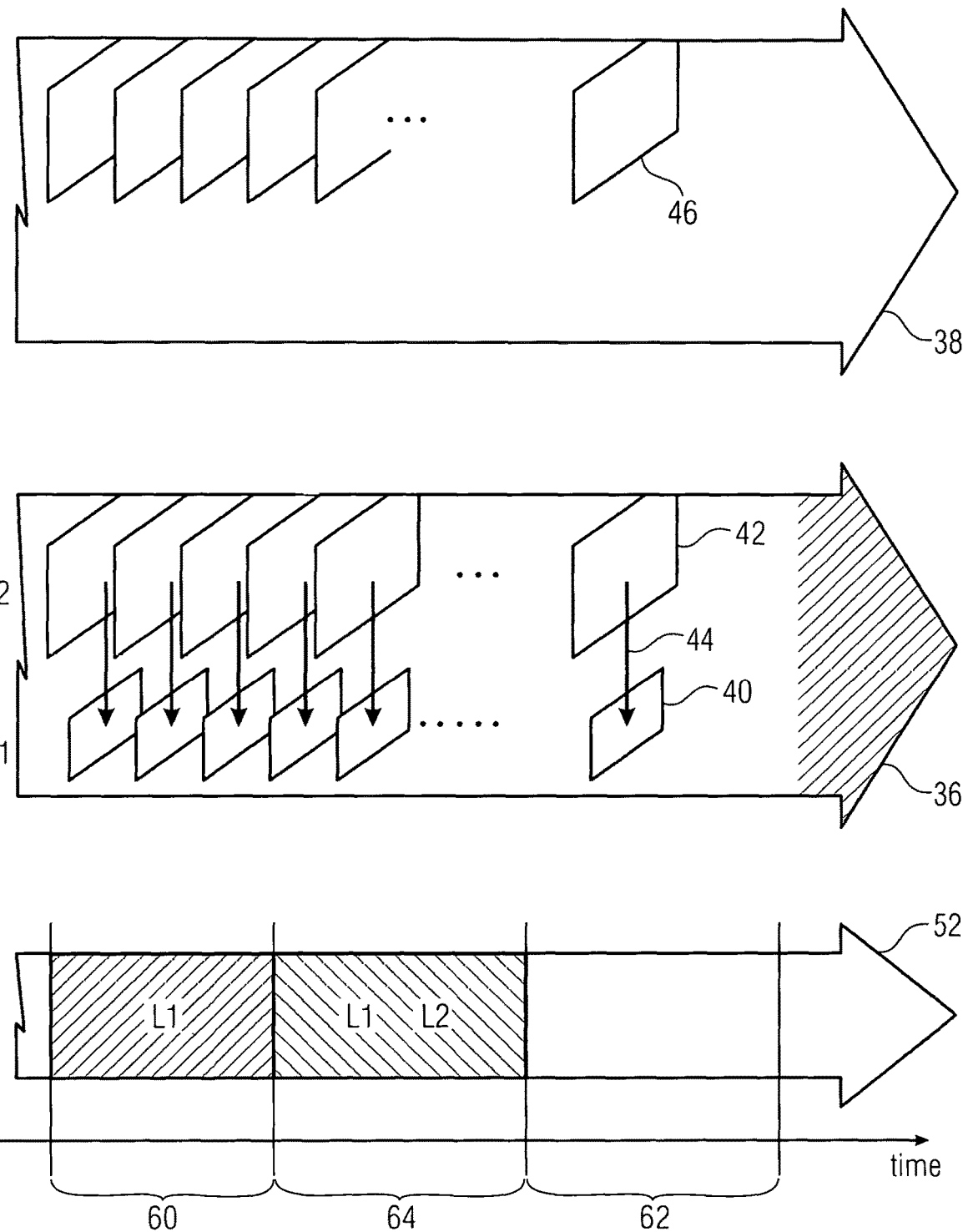
FIG. 8 shows a schematic diagram illustrating the inbound stitched video data stream as obtained from a server by the client device of FIG. 6 when using the streams of FIG. 5.

FIG. 8 illustrates the mode of operation of client device 50 in accordance with an embodiment where client device 50 cooperates with output device 20 which offers streams 36 and 38 as described with respect to FIG. 5. That is, stream 52 is a stream like stream 22 explained with respect to FIG. 5. As shown in FIG. 8, client device 50 retrieves, during the second temporal portion 64, layer 1 and layer 2, L1 and L2, of the layer video stream 36 from the output device by fetching temporal segments thereof from output device 20. A client device 50 submits both layers L1 and L2 to video decoder 58 which, in turn, performs the up-sampling 66 in decoding the second layer L2 as the second layer L2 is coded using inter-layer prediction 44 as discussed above. By this measure, video decoder 58 fills an internal decoded picture buffer with pictures of the second spatial resolution which may then serve as reference pictures for random access dependent pictures of the increases spatial resolution video stream 38 which client device 50 retrieves by fetching corresponding temporal segments thereof during subsequent temporal portion 62. In the preceding temporal portion 60, in turn, client device 50 may merely submit the first layer for decoding to video decoder 58, i.e., without the second layer. Client device 50 may retrieve the second layer during the temporal portion 60 or not depending on whether, for example, output device 20 allows for a separate retrieval or fetching layers L1 and L2 of the layered video stream 36 or not.

Figure 9:
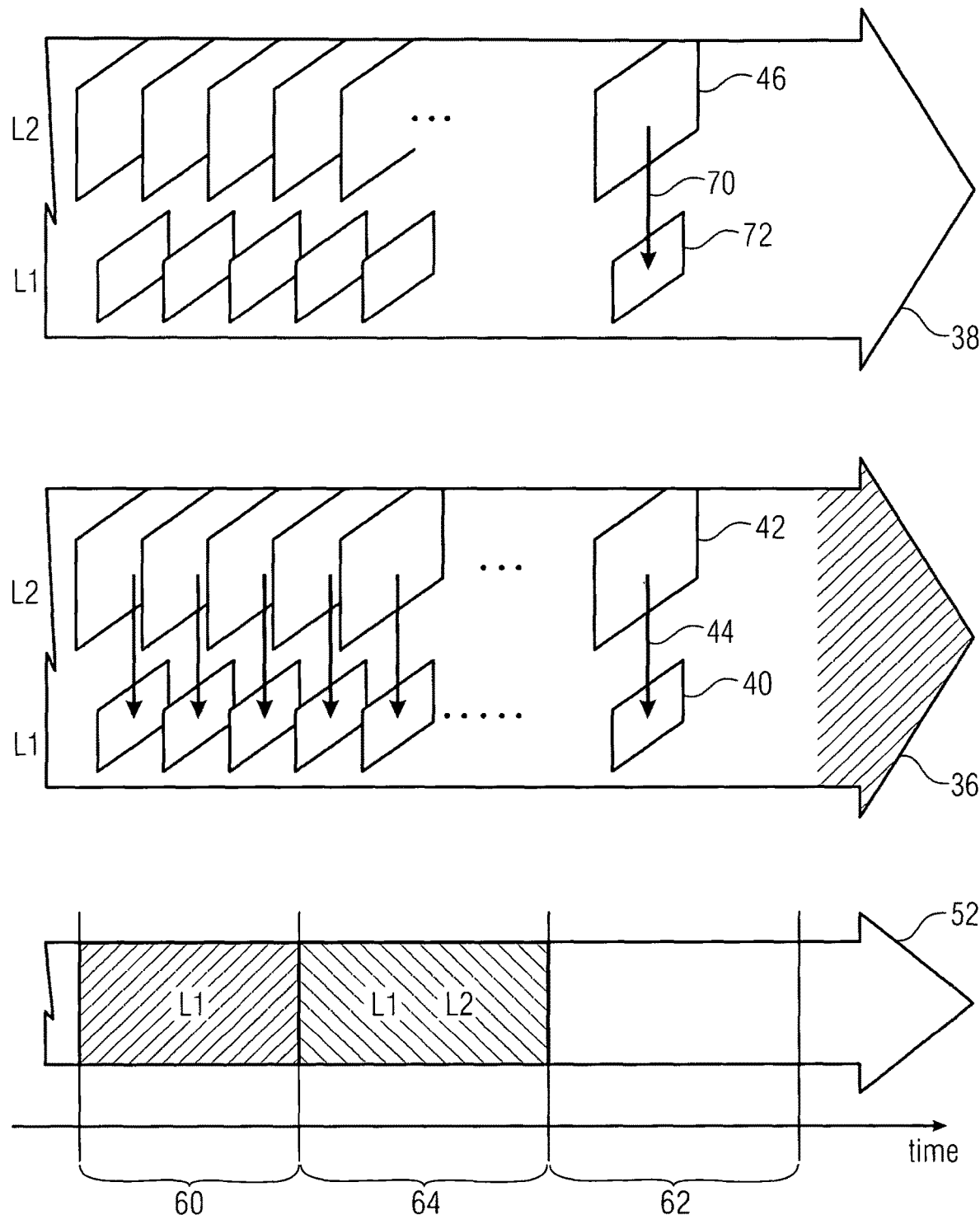
FIG. 9 shows as a schematic diagram illustrating the used streams of FIG. 8 by showing that the increased spatial resolution video stream may also be a layered video stream.
Figure 10:
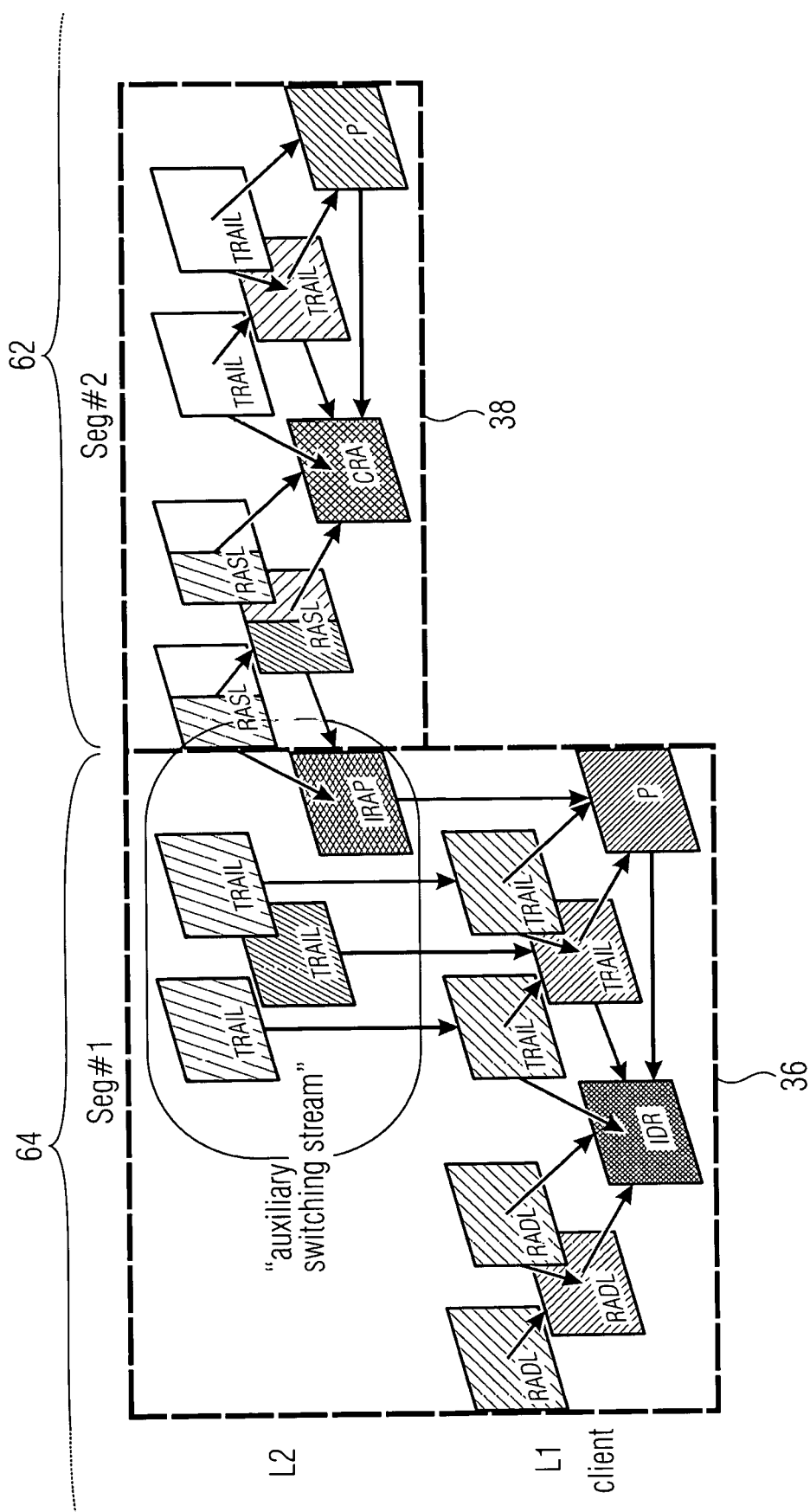
FIG. 10 shows a schematic diagram illustrating a splicing point of a spliced video data stream as received by the client device of FIG. 6 when using an independently coded layer for the increased spatial resolution video data stream and using segments carrying both first and second layers for the layered video data stream.

FIG. 9 illustrates the case that the increased spatial resolution video stream 38 may also be a layered video stream having a first layer L1 and a second layer L2, wherein the pictures 46 of the second spatial resolution are not only coded using an open GOP structure, i.e., using temporal prediction, but also using inter-layer prediction 70 using upsampling from pictures 72 of layer L1 of stream 38 to the second resolution of pictures 46. Stream 38, however, then also uses residual coding for coding pictures 42 of layer L2. In other words, in the example of FIG. 9, pictures 42 of layer L2 of the layered video stream 36 are coded into data stream 36 without exploiting temporal redundancies, whereas pictures 46 are coded into stream 38 with exploiting both inter-layer and temporal redundancies, i.e., by removing them and using residual prediction. This corresponds to the first option mentioned before the description of FIG. 4. In accordance with an alternative embodiment, pictures 46 are encoded into stream 38 as a layer of a layered video stream but without inter-layer prediction, i.e., as an independent layer. The layer index of pictures 46 coded into data stream 38 may be the same as the layer index of L2 in layered video stream 36. A transition between temporal portions 64 and 62 which would then result is illustrated in FIG. 10. FIG. 10 shows two consecutive segments within stream 52 arriving at device 50 at the junction between temporal portions 64 and 62, i.e., the first segment in data stream 52 carries layers L1 and L2 of layered video stream 36, and a temporal segment succeeding thereto, carries the independently coded layer L2 of stream 38. As can be seen, the pictures of layer L2 of layered data stream 36, which are obtained by inter-layer upsampling, serve as reference pictures for the RASL pictures of the following segment of stream 38 which segment, in turn, is coded without inter-layer prediction. That is, although reference pictures for RASL pictures in the independent layer L2 of stream 38 have to be present in the decoded picture buffer (DPB) of decoder 58, at the correct resolution, this does not hinder the possibility of switching between the different spatial resolutions due to the measures taken and described above.

Thus, with respect to the above examples, an embodiment has been described where a layered codec such as SHVC has been used in order to allow the usage of open GOP structures in adaptive streaming for encoding a higher spatial resolution representation of a video. The embodiments generate and offer a "auxiliary switching track" as well as information to a user/client of the existence and usage of such a track.

As will be described in more detail below, timing information may be conveyed from server to client in order to inform the client as to how long the transition phase 64 between switching from a lower spatial resolution to a higher spatial resolution representation should be. By this measure, the client is informed about the necessity, for example, of decoding additional NAL units encapsulated within the "auxiliary switching track" that should be decoded some time before switching to the actual higher quality track during temporal portion 62. Hence, higher quality layer RASL pictures such as those shown in FIG. 10 can be decoded with significantly less impairment at visually appealing quality and be output instead of the corresponding pictures of the lower quality track, in case of considering open GOP structures for a layered codec using inter-layer prediction. In case of using layered codecs for a single-layer prediction (so-called independent layers), the client should schedule enough time for decoding the "auxiliary switching track" represented by pictures 42, a specific time before starting decoding a higher independent layer encoded in open GOP configuration such as, for example, pictures 46 with associated RASL pictures.

Briefly, referring back to the description of FIG. 6, it should be noted that the client device 50 may be agnostic with respect to with a way the streams or representations available for retrieval at the server are coded. Accordingly, in accordance with an embodiment, the output device or server informs the client device or client on the necessity to schedule the transition phase pertaining the second temporal portion 64 between the retrieval of the video at the first spatial resolution and the retrieval of the video at the second spatial resolution or before switching the video stream 38. Depending on this signalization, the client device 50 may skip or leave off the transition phase or not. By this measure, another video available at the same server or another server at different spatial resolution representations with the higher spatial resolution representation being coded, for example, in a closed GOP structure, may be retrieved without any transition phase when switching from the lower spatial resolution representation to the higher spatial resolution representation.

In a concrete example, stream 22 and 52, respectively, may be transferred between server and client or device 20 and 50, respectively, in a file format where an additional track is spent for carrying layer L2 of the layered video stream 36. This track could be marked as "switching track/representation". The marking indication as switching track do not have to be contained in the file format but could be contained in the manifest sent from server to client, i.e., device 20 to device 50 such as the MPD in DASH or the initial segment of the respective video. Although it could be that server and client, i.e., device 20 and 50, could use a default temporal name for the transition phase for temporal portion 64 so that the aforementioned signalization in, for example, the manifest regarding the transition phase may merely correspond to a binary signalization in the sense of switching between necessity of the transition phase of a predetermined length or the leaving-off of the respective transition phase, alternatively, it is possible that the server informs the client on the length of the transition phase and the length of the temporal portion 64, respectively. The length could be indicated by indexing one of a plurality of predetermined length values agreed between server and client, an indication of the length and units of temporal segments at which the video is retrievable by the adaptive streaming protocol, or in units of time such as in units of picture order count or the like. For example, the manifest or media presentation description sent from the server or device 20 to the client or device 50 could be provided with an indication of the length of temporal portion 64 like at switching time shift or at numSwitchRepSegments.

Later on, it will be shown that stream 38 may be a video stream comprising a supplemental enhancement information (SEI) that allows for the derivation of the just mentioned transition phase length by providing an information on a maximum distance to the reference picture form a RASL picture referring the respective reference picture wherein this information is to be understood as a promise. In HEVC, the structures of pictures SEI is, for example, not scoped for the whole coded video sequence (CVS) and could, accordingly, not suffice in this regard. Accordingly, a new type of supplemental enhancement information SEI would be advantageous.

Device 20 of the server could, accordingly, derive the length of the transition period 64 from this supplementary enhancement information and inform the client on device 50 via the manifest accordingly.

As also becomes clear from the above discussion, the client or device 50 may either be configured to inevitably apply the transition phase concerning temporal portion 64, thereby inevitably playing out the switching track or switching representation in the form of layer L2, or the transition phase would be optional and would be switched on by the server or device 20 using the aforementioned signalization in, for example, the manifest. In other words, it could be optional or mandatory to play out the switching track of representation in the form of layer L2 of the layered video stream 36.

As far as layer L1 of the layered video stream 36 is concerned, it is noted that it may be coded in a closed GOP structure using, for example, IDR pictures. By this measure, client or client device 50 may directly, i.e., without any transition, switch from the higher spatial resolution, i.e., downloading stream 38, to the lower spatial resolution, i.e., downloading layer L1 of stream 36.

Figure 11:
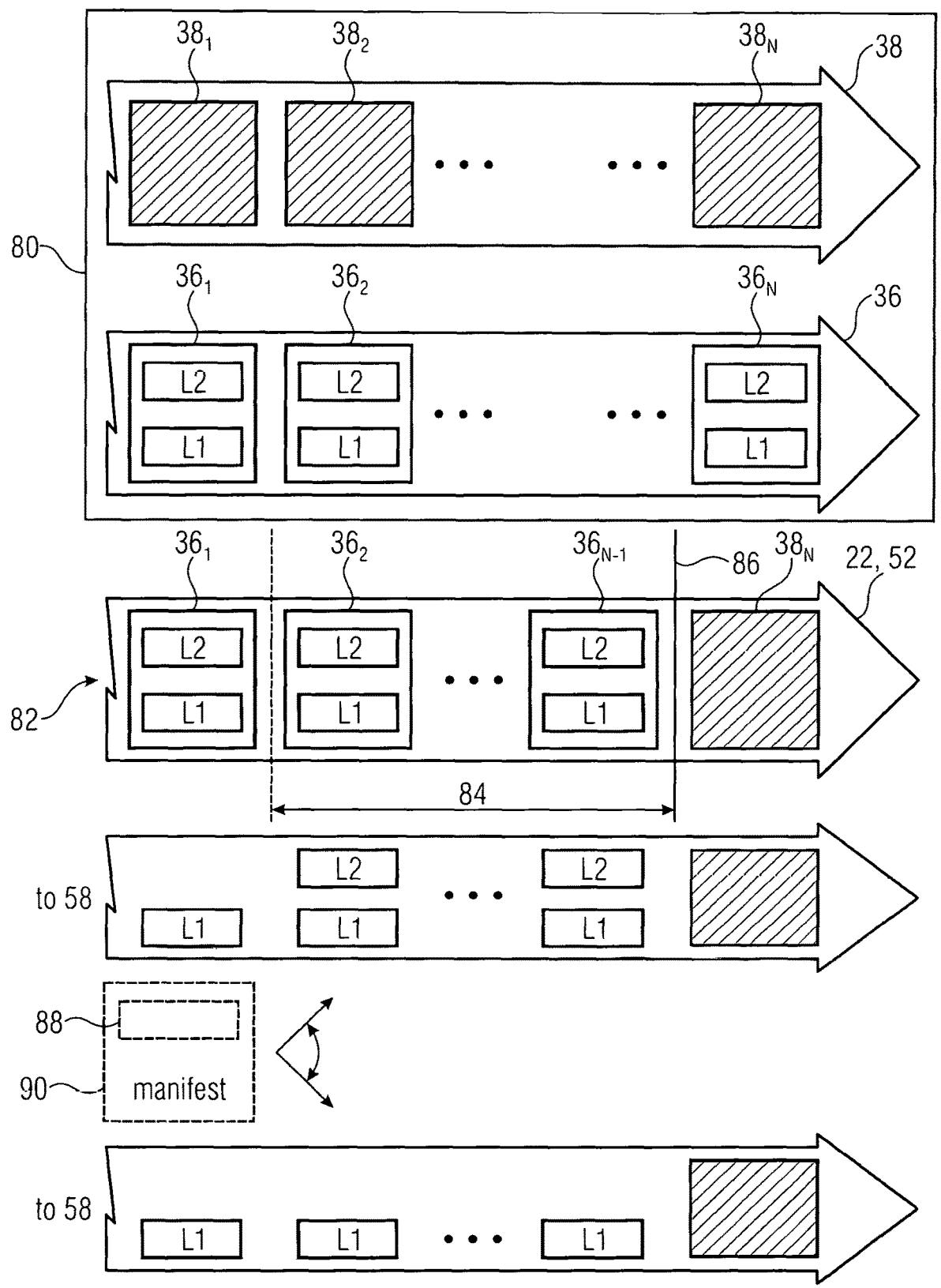
FIG. 11 shows a schematic diagram illustrating the data structure prepared for adaptive streaming at the server side in accordance with an embodiment where the segments of the layered video stream comprises the first layer and the second layer within common segments.

FIG. 11 illustrates a concrete example with respect to the way the auxiliary switching track in the form of layer L2 of layered video stream 36 is offered to the client. FIG. 11 illustrates the data structure that might be stored in storage 32 of the output device 20. The data structure is indicated using reference sign 18 and comprises the increased spatial resolution video stream 38 and the layered video stream 36. Both are temporally sub-divided into a sequence of temporal segments. The temporal segments of stream 38 are denoted $30_1 \ldots 38_N$ and the temporal segments of stream 36 are denoted $36_1 \ldots 36_N$. Time-aligned temporal segments $38_i$ and $36_i$ pertain, or have encoded therein, a corresponding temporal portion of a video. In accordance with the embodiment of FIG. 11, layer L2 of layered video stream 36 is not separately retrievable by the client. Rather, layer L2 is included as an additional track within the same segments $36_i$ within which layer L1 of stream 36 is conveyed. Thus, it is shown at 82, the client or client device 50 would schedule a transition phase 84 before any start 86 of retrieving the video in the form of data stream 38 from the server or device 20. Within the transition phase 84, stream 22/52 comprises a sequence of corresponding temporal segments of stream 36. That is, during the transition phase 84, device 50 fetches the segment belonging to transition phase 84 out of the segments of layered video stream 36, thereby forming temporal portion 64. From time 86 onwards, device 50 fetches the temporal segments out of those sequence of segments of stream 38 until switching back from the increased spatial resolution to the lower spatial resolution. The difference between the mode of operation of device 50 during the transition phase 84 and the time before is the following.

As can be seen in FIG. 11, in the embodiment shown, the client device merely has the choice between fetching segments of layered video stream 36 or segments of increased spatial resolution video stream 38. Before switching to increased spatial resolution video stream 38, client device 50 schedules the transition phase 84. Before the transition phase, client device 50 merely forwards layer L1 of the layered video stream 36 to decoding by video decoder 58 while, during the transition phase, client device 50 forwards both layers L1 and L2 to the video decoder 58. During this time 84, the video decoder 58 reconstructs pictures 42 of layer L2 of the layered video stream which then serve as reference pictures for random access dependent pictures of one or more segments of the increased spatial resolution video stream 38 retrieved from the server or device 20 from time 86 onwards. FIG. 11 illustrates the above outlined possibility that client device 50 schedules the transition phase 84 responsive to a corresponding signalization 88 from the server or output device 20 which signalization 88 may, for instance, be included in the media presentation description or manifest 90. If the signalization 88 indicates layer L2 to be used as reference picture substitute reservoir in transition phase 84, client device 50 acts as described so far. If not, client device 50 does not schedule the transition phase 84 before starting a time 86 retrieving temporal segments of the increased spatial resolution video stream 38 but directly extends the phase of merely subjecting layer L1 to decoding by video decoder 58 to a switching time 86 as illustrated at the bottom of FIG. 11.

The latter embodiment of FIG. 11 involved including the "auxiliary switching track" L2 of stream 36 within the segment of the layered video stream 36. In the media presentation description or manifest 90, this auxiliary switching track would be indicated as a representation separate from a representation formed by layer L1 of the layered video stream 36. Manifest 90 would signal, for instance, the decoding capabilities for video decoder 58 to decode layer L2 which, in turn, is dependent on layer L1, i.e., to decoder the "auxiliary switching track" and indicate the decoding capabilities for video decoder 58 to decode merely the low-resolution layer L1 of the layered video stream 36.

The following concrete signalization could be used within manifest 90 in order to signal to the client device 50 information concerning the auxiliary switching track L2 such as, for example, information 88 which indicates the existence of the auxiliary switching track L2 and, maybe, concurrently the length of the transition phase 84. Additionally, as just outlined, the capabilities with respect to L2 are merely signaled.

The capabilities of a representation are currently signaled with the @mimeType attribute. The first attribute that would be needed to be defined is that switching to a given representation is allowed, i.e. the needed "auxiliary track" is included within the segments. Such an attribute could be named e.g. @switchableTo. Additionally the @switchingMimeType attribute should be defined describing the needed capabilities when the "auxiliary switching track" is decoded. Finally, the time before the switch that the "auxiliary switching track" needs to be decoded needs to be signaled so that the DASH client can decide whether it can switch to a higher-resolution representation seamlessly or not (@switchingTimeShift/@numSwitchRepSegments). In order to be able to switch to such a higher-resolution representation the user has to random-access the lower representation from a SAP earlier than the time described by (@switchingTimeShift/@numSwitchRepSegments). The concrete signaling could see as follows:

| Element or Attribute Name | Use | Description |
| --- | --- | --- |
| Representation | | This element contains a description of a Representation. |
| @id | M | specifies an identifier for this Representation. The identifier shall be unique within a Period unless the Representation is functionally identically to another Representation in the same Period. The identifier shall not contain whitespace characters. If used in the template-based URL construction as defined in 5.3.9.4.4, the string shall only contain characters that are permitted within an HTTP-URL according to RFC 1738. |
| @bandwidth | M | Consider a hypothetical constant bitrate channel of bandwidth with the value of this attribute in bits per second (bps). Then, if the Representation is continuously delivered at this bitrate, starting at any SAP that is indicated either by @startWithSAP or by any Segment Index box, a client can be assured of having enough data for continuous playout providing playout begins after @minBufferTime * @bandwidth bits have been received (i.e. at time @minBufferTime after the first bit is received). For dependent Representations this value shall specify the minimum bandwidth as defined above of this Representation and all complementary Representations. |
| @qualityRanking | O | specifies a quality ranking of the Representation relative to other Representations in the same Adaptation Set. Lower values represent higher quality content. If not present then no ranking is defined. |
| @dependencyId | O | specifies all complementary Representations the Representation depends on in the decoding and/or presentation process as a whitespace-separated list of values of @id attributes. |

| Element or Attribute Name | Use | Description |
|---|---|---|
| | | If not present, the Representation can be decoded and presented independently of any other Representation.<br>This attribute shall not be present where there are no dependencies. |
| . . . | . . . | . . . |
| @switchableTo | O | specifies all Representations for which the Representation contains additional data to switch to as a whitespace-separated list of values of @id attributes.<br>This attribute shall not contain any value x if this Representation and the Representation with @id = x do not have the same @mediaStreamStructureId. |
| @switchingMimeType | O | specifies the MIME type of the concatenation of the Initialization Segment, if present, and some consecutive Media Segments in the Representation and some consecutive Media Segments in the Representation pointed by @switchableTo as a whitespace-separated list of values. |
| @switchingTimeShift | O | specifies the time before the start of the segment at which switching can happen (e.g. SAP 3) at which the additional data corresponding to the @switchingMimeType needs to be decoded to be able to seamlessly switch to a given representation. |
| @numSwitchRepSegments | O | specifies the number of segments before the start of the segment at which switching can happen (e.g. SAP 3) at which the additional data corresponding to the @switchingMimeType needs to be decoded to be able to seamlessly switch to a given representation. |
| CommonAttributesElements | — | Common Attributes and Elements (attributes and elements from base type *RepresentationBaseType*)), for more details see 5.3.7 |
| . . . | . . . | . . . |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @. List of elements and attributes is in italics bold referring to those taken from the Base type that has been extended by this type.

An alternative of the description is brought forward with respect to FIG. 11 could be that it is agreed between client device 50 and output device 20 that client device 50 subjects the auxiliary switching track L2 to decoding by video decoder 58. Video decoder 58 would automatically have reference picture substitutes for random access dependent pictures of the increased spatial resolution video stream 38 at hand provided that any switching to the increased spatial resolution video stream 38 does not take place earlier than the length of the transition phase 84 from having started fetching a sequence of segments of the layered video stream 36. Accordingly, even in this case of needing the client device 50 to inevitably subject layer L2 to decoding, client device 50 is to schedule the transition phase 84 before switching to the increased spatial resolution data stream 38.

Thus, an alternative embodiment to the one described with respect to FIG. 11 is that, alternatively, another embodiment is that the user is signaled that in order to be able to switch seamlessly to another representation n+1, no-additional time information is needed but the user has to decode the whole time the "auxiliary switching track" from the first AU present in the auxiliary track in segment n. Still in such a case the mimeType of this alternative representation the user would need to know what he needs to be able to decode such a track. Besides, the user could derive the resolution of the output from the Representation pointed by the @switchableTo attribute. In order to be able to switch to such a higher-resolution representation the user has to random-access the lower representation from any SAP earlier than the SAP in the higher-resolution.

| Element or Attribute Name | Use | Description |
|---|---|---|
| Representation | | This element contains a description of a Representation. |
| @id | M | specifies an identifier for this Representation. The identifier shall be unique within a Period unless the Representation is functionally identically to another Representation in the same Period. |

-continued

| Element or Attribute Name | Use | Description |
|---|---|---|
| | | The identifier shall not contain whitespace characters. If used in the template-based URL construction as defined in 5.3.9.4.4, the string shall only contain characters that are permitted within an HTTP-URL according to RFC 1738. |
| @bandwidth | M | Consider a hypothetical constant bitrate channel of bandwidth with the value of this attribute in bits per second (bps). Then, if the Representation is continuously delivered at this bitrate, starting at any SAP that is indicated either by @startWithSAP or by any Segment Index box, a client can be assured of having enough data for continuous playout providing playout begins after @minBufferTime * @bandwidth bits have been received (i.e. at time @minBufferTime after the first bit is received). For dependent Representations this value shall specify the minimum bandwidth as defined above of this Representation and all complementary Representations. |
| @qualityRanking | O | specifies a quality ranking of the Representation relative to other Representations in the same Adaptation Set. Lower values represent higher quality content. If not present then no ranking is defined. |
| @dependencyId | O | specifies all complementary Representations the Representation depends on in the decoding and/or presentation process as a whitespace-separated list of values of @id attributes. If not present, the Representation can be decoded and presented independently of any other Representation. This attribute shall not be present where there are no dependencies. |
| . . . | . . . | . . . |
| @switchableTo | O | specifies all Representations for which the Representation contains additional data to switch to as a whitespace-separated list of values of @id attributes. This attribute shall not contain any value x if this Representation and the Representation with @id = x do not have the same @mediaStreamStructureId. |
| @switchingMimeType | O | specifies the MIME type of the concatenation of the Initialization Segment, if present, and some consecutive Media Segments in the Representation and some consecutive Media Segments in the Representation pointed by @switchableTo as a whitespace-separated list of values. |
| *CommonAttributesElements* | — | Common Attributes and Elements (attributes and elements from base type *RepresentationBaseType*), for more details see 5.3.7 |
| . . . | . . . | . . . |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @, List of elements and attributes is in italics bold referring to those taken from the Base type that has been extended by this type.

As stated above, the length of transition phase 84 may be set to a default value so that there is no need to transmit same. For example, by default, transition phase could be 84 one segment length long. That is, the temporal coding inter-dependencies could be limited so as to not by longer than one segment length, at least as far as representation switching instances are concerned, i.e. times where switching between representations is allowed. A further alternative embodiment of using transition phase so as to improve switching between different qualities uses this default setting and could be implemented as follows. In particular, the just-described embodiment could be used to inform in a manifest file such as a DASH MPD, a client on the advantageous consideration of the transition phase in switching to a higher quality layer.

For example, a Supplemental Property Descriptor could be denoted as "urn:mpeg:dash:resolutionSwitching:2016" and used to indicate which Representations allow for a seamless resolution switching at the start of any Segment starting with a SAP type in the range of 1 to 3, inclusive. The descriptor could be placed on Adaptation Set or Representation level in the MPD hierarchy when used in DASH. @value of the supplemental property descriptor is a whitespace separated list of two values as specified in the following table:

Supplemental Property@value attributes resolution-Switching:2016

| SupplementalProperty@value parameter | Use | Description |
|---|---|---|
| switchableTo | M | specifies all Representations with representation switch points specified with RandomAccess with @type equal to "open", with Media Segment starting with SAP of type 3, or with Media Subsegment starting with SAP of type 3 for which the Representation contains additional media stream to switch to, as a comma-separated list of values of @id attributes of these Representations. |
| switchingMimeType | M | specifies, as a comma-separated list of values, the MIME type of the concatenation of the Initialization Segment, if present, and some consecutive Media (Sub)Segments in the Representation and some consecutive Media (Sub)Segments that start with a representation switch point as defined above and belong to the Representation pointed by the respective list item within switchableTo.<br>NOTE - The Representation contains a media stream conforming to @mimeType and additionally one or more media streams conforming to switchingMimeType that are only intended for switching to another representation, as indicated by switchableTo. |

Legend:
M = Mandatory,
O = Optional

That is, this example shows, that a descriptor could indicate, for a certain representation such as $L_1$, which representations are available for being switched to, such as $L_2$. Irrespective of this descriptor indicating such representation(s) explicitly, the descriptor could, by its presence in the MPD, indicate that one segment perfected in advance before switching to representation $L_2$ suffices to have all temporal references potentially preceding the switching point owing to open GOP structure, for instance. In other words, by default, to resolution switching descriptor shall not be present unless all access units in a segment N with presentation time within $[T_{EPT}, T_{DEC})$ is constrained in such a way that they only depend on access units of segment N or segment N−1. Thus, if a Representation is changed at segment N, where this descriptor is present, it might be needed to decode an additional media stream during segment N−1, namely in FIG. 11 the enhancement layer of the layered stream, different to the one conforming to the @codecs attribute indicated at the "switch-from" representation, which presence is indicated by the presence of switchingMimeType, namely in FIG. 11 the single-layered high quality stream, in order to be able to decode all access units preceding the first SAP (i.e., in the interval $[T_{EPT}, T_{DEC})$) of segment N of the "switch-to" Representation.

Figure 12:
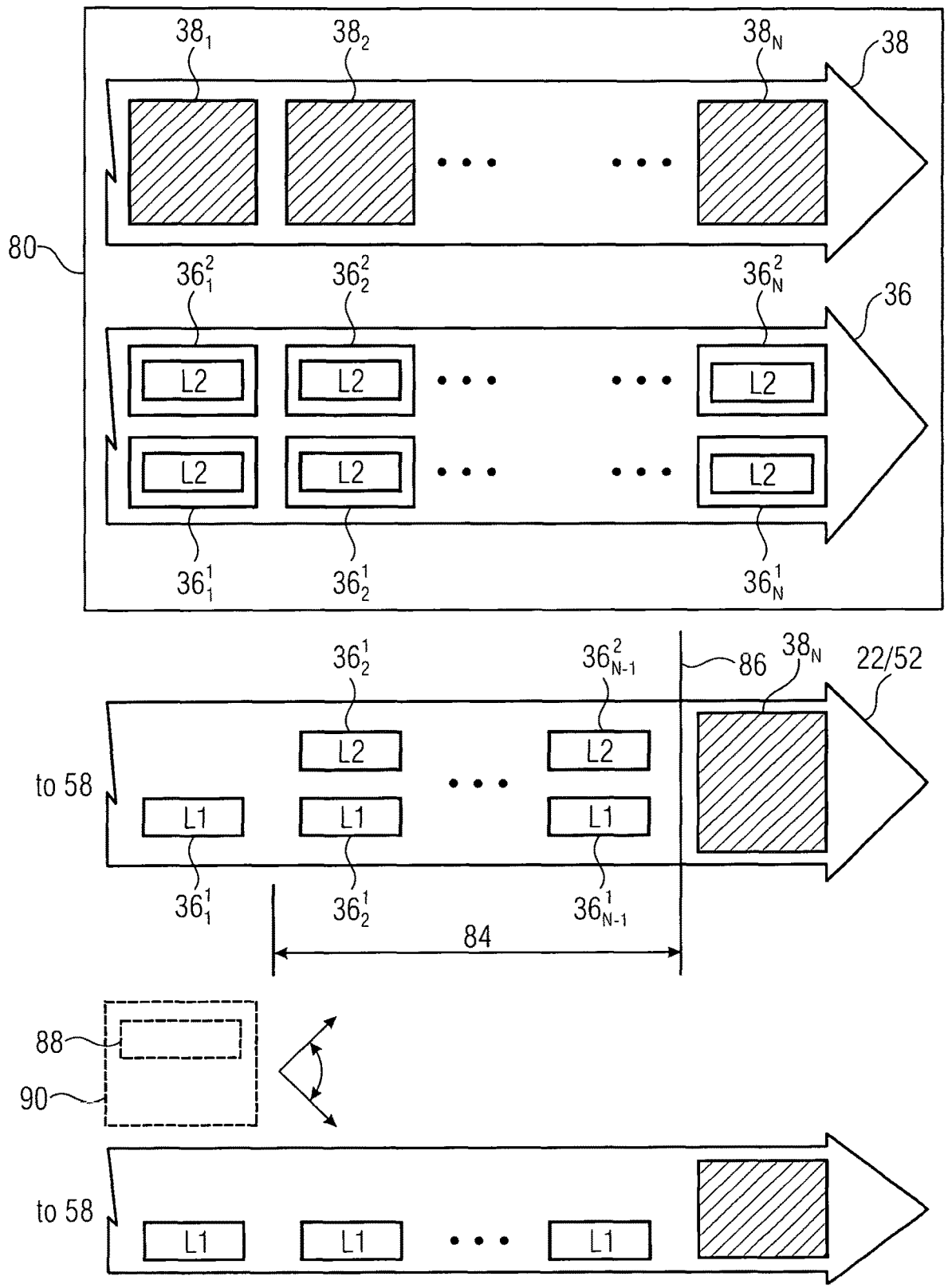
FIG. 12 shows a schematic diagram illustrating the data structure in accordance with an alternative embodiment to FIG. 11 where separate segments are used for first and second layers within a layered video stream.

FIG. 12 shows an alternative embodiment compared to the embodiment of FIG. 11 where the data structure 80 has separate time-aligned segments for layer L1 and L2 of layered video stream 36, namely time aligned segment $36^2_i$ and $36^1_i$. All temporal segments $36^1_i$, $36^2_i$ and $38_i$ are associated with different addresses and are therefore individually fetchable by client device 50. Here, the client device 50 merely fetches segments $36^1$ from the output device 20 during the time portion preceding the transition phase 84. During the transition phase 84, client device 50 retrieves for each temporal segment i of the video both temporal segments $36^1_i$ and $36^2_i$ from the output device 20, thereby forwarding to the video decoder 58 not only layer L1 but also layer L2. From time 86 on, client device 50 retrieves or fetches the temporal segments $38_i$ of the increased spatial resolution video stream 38 and forwards same to the video decoder 58. Again, FIG. 12 illustrates that information 88 may control the client device 50 to apply or not apply the transition phase 84.

That is, FIG. 12 illustrates an embodiment where a separate representation is used that contains the additional data entailed for switching, namely the data within layer L2 of the layered video stream 36. That is, in the embodiment of FIG. 12, this data is not included within the same segments also carrying the base layer L1.

Figure 13:
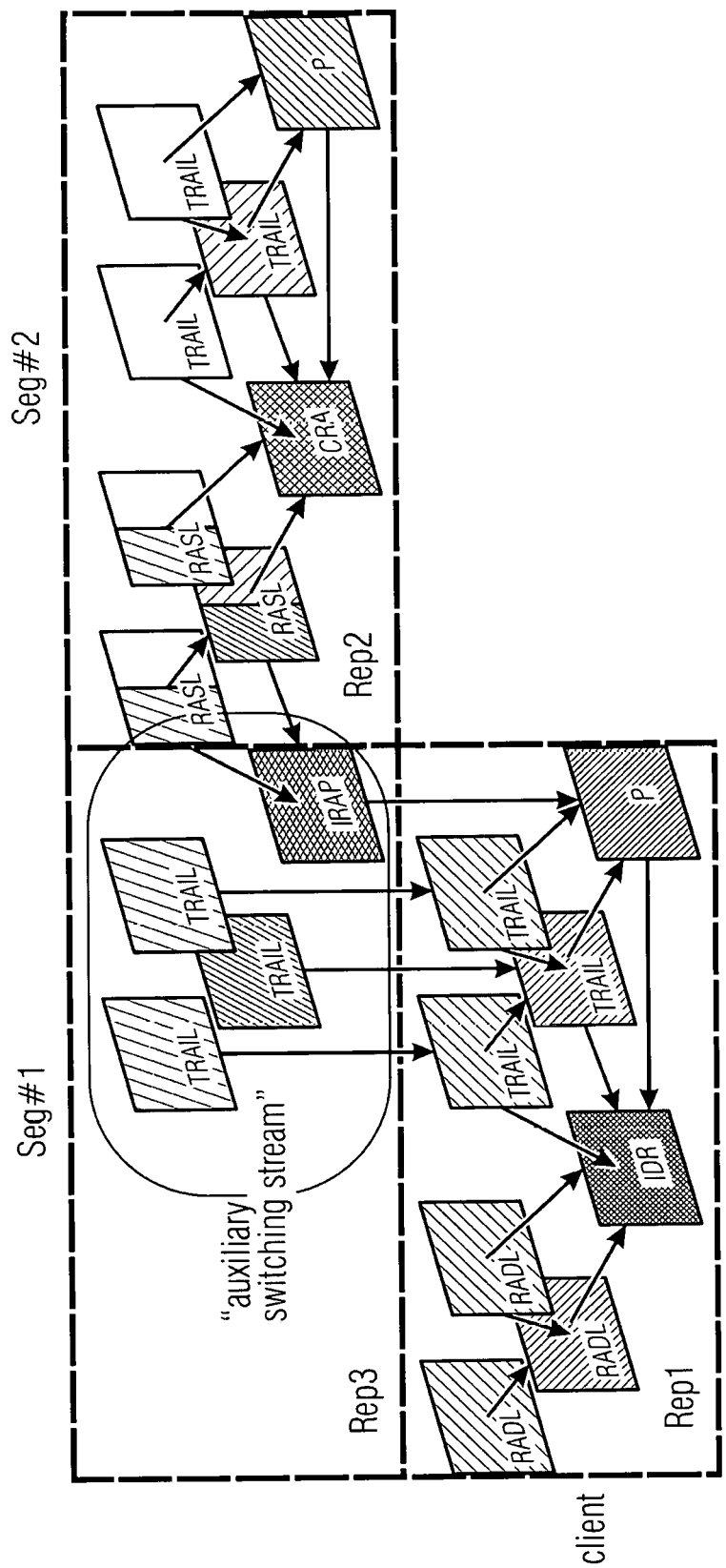
FIG. 13 shows a schematic diagram illustrating the situation of FIG. 10, but here using separate segments for first and second layers of the layered video stream.

FIG. 13 illustrates for the latter embodiment the same situation as shown in FIG. 3, however the client device retrieving two segments for the first temporal segment of the video, namely one of representation 1 corresponding to layer L1 of the layered video stream 36, and the corresponding temporal segment of a representation 3 which corresponds to layer L2 of the layered video stream. As far as the manifest 90 and the description of the availability of the video at the output device or server 20 is concerned, the following may be noted.

In such a case Rep3 should include @dependencyId=Rep1 and Rep2 and Rep3 should have the same @mediaStreamStructureId. In such a case Rep3 would not need an additional @mimeType as a representation it should already include it. However, this representation should be marked as "only intended for switching" with for instance a parameter @switchingRepresenation. As for the previous case timing information could be included indicating from which point onward it is needed to decode such a representation to be able to switch to another representation or it could be restricted in such a way that as long as it is decoded from the SAP in Rep1 previous to the switching point in Rep2 all obligatory references are available.

Another embodiment consists of having only closed GOP RAPs (or switching points) in the lowest resolution and only Open GOP RAPs in the higher resolution. This allows for seamless switching to the lowest quality at all available RAPs. Alternatively if more resolutions are available, for instance 3, the lowest resolution has only closed GOP RAPs, the highest resolution has only Open GOP RAPs and the middle resolution representation has a mixture of both. Switching up is possible at the presence of any RAP but switching down only at the present of closed GOPs. In such a case, the existing @switchingPeriod should be extended to differentiate between upSwitching and downSwitching.

A further embodiment relates to the presence at the video of information about the largest amount of pictures in the past that the RASL pictures can refer to for prediction. This information would be entailed to derive the described attributes at the MPD in previous paragraphs. This information could be included, for instance, in the form of an SEI or in the VUI itself.

| SEI: | |
| --- | --- |
| constrained_skipped_leading_pictures( payloadSize){ | Descriptor |
|     max_sub_layer_minus1 | u(3) |
|     for (i = 0; i <= max_sub_layers_minus1; i++) { | |
|         max_reference_poc_difference[i] | ue(v) |
|     } | |
| } | |

| VUI: | |
| --- | --- |
| vui_parameters( ){ | Descriptor |
| ... | |
|     constrained_rasl | u(1) |
|     if(constrained_rasl){ | |
|         max_sub_layer_minus1 | u(3) |
|         for (i = 0; i <= max_sub_layers_minus1; i++) { | |
|             max_reference_poc_difference[i] | ue(v) |
|         } | |
|     } | |
| } | |

In the above syntax examples, a sub-layer specific signaling is exemplified where max_reference_poc_difference [i] indicates the maximum difference between RAD pictures and RAM pictures, e.g. TRAIL and RASI pictures in Q2 of FIG. 3. In case of including the syntax element in the VUI, the scope may be that of a SPS, i.e. a sequence of pictures until replaced by a next valid SPS, and in case of conveying the syntax element in an SEI, the scope may be a sequence of pictures until replaced by a next SEI of that sort, i.e. an constrained_skipped_leading_pictures SEI message. That is, during that scope, the video is coded into the video stream obeying the promise with respect to maxreference_poc_difference[i]. The "sub-layers" i differentiate between different temporal layers, e.g. layers wherein with decreasing sub-layer ID i an increasing number of pictures are left-out, so that owing to temporal picture-interdependency disappearance from higher sub-layers to lower sub-layers, max_reference_poc_difference[i] monotonically decreases with decreasing i or, alternatively speaking, max_reference_poc_difference[i] max_reference_poc_difference[i+1]. However, other structures may be imaginable, too. It should be noted, however, that the signaling above is merely to be understood as an example, and that the sub-layer dependency of the length indication max_reference_poc_difference[i] may be left-off with, for example, not supporting temporal scalability at all or merely signaling max_reference_poc_difference for the highest sub-layer. max_reference_poc_difference measures the interesting time difference between first referenced trailing to first referencing RASL, for example, in number of POCs, i.e. in number of pictures. The difference or length is measured in the presentation time order.

Thus, above embodiments revealed a Device 20 for outputting, using an adaptively streaming protocol, such as DASH or another adaptive streaming protocol, a video 24 to a client, the device 20 supporting switching between, at least, outputting the video 24 in form of a layered video stream 36, and outputting the video 24 in form of an increased spatial resolution video stream 38. The increased spatial resolution video stream 38 is encoded using an open GOP (Group of Pictures) structure, i.e. using temporal prediction in open GOP configuration as exemplarily depicted in FIG. 2, i.e. a configuration where the pictures are grouped into GOPs each comprising a RA (random access) picture followed, in decoding order, by RAD (Random Access Dependent) pictures preceding the RA picture in presentation/display order and referencing the RA picture as well as a RAM (in case of Random Access potentially Missing) reference picture preceding the RA picture in decoding order. The increased spatial resolution video stream 38 has encoded thereinto the video at a second (increased) spatial resolution and at a second (increased) quality or bitrate. The support of the switching is an outcome of the device's 20 provision of streams 36 and 38 for retrieval by the client along with the provision of the client with a manifest which provides the client with the corresponding information. In principle, embodiments could, however, also work with DASH2, i.e. adaptive streaming protocols allowing for a server driven pushing of stream segments to the client. The layered video stream 36 comprises a first layer L1 having encoded thereinto the video at a first spatial resolution and a second layer L2 having encoded thereinto pictures of the video at the second spatial resolution and a first quality lower than the second quality and using inter-layer prediction (44) from the first to the second layer by way of inter-layer upsampling, but without prediction residual coding. As shown in the above examples, the second layer L2 may have encoded thereinto the pictures of the video merely using inter-layer prediction (44) from the first to the second layer by way of inter-layer upsampling, i.e. without prediction residual coding and without temporal prediction, i.e. the pictures of L2 are merely coded as upsampled versions of the temporally corresponding pictures of layer L1.

As the device 20 may be agnostic with respect to the exact way the video streams are offered for switching there between, the above embodiments also revealed a device 20 for outputting, using an adaptively streaming protocol, the video to a client, the device supporting switching between, at least, outputting the video in form of a first video stream, namely L2 in case of transmission of layers L1 and L2 in separate segments and 36 in case of transmitting same within common segments; and outputting the video in form of a second video stream 38, wherein the device 20 is configured to inform the client 50 on the necessity to schedule a transition phase 64 before switching from retrieving the video in form of the first video stream to retrieving the video in form of the second video stream 38. In case of using common segments as shown in FIGS. 10 and 11, the output device provides the client with a manifest describing an availability of the video for the client in a first spatial resolution in form of the first video stream 36 and in the second spatial resolution in form of the second video stream 38 and indicating a presence of a second layer L2 in temporal segments of the first video stream and a purpose of the second layer L2: namely, to be played-out when switching from the first spatial resolution to the second spatial resolution during the transition phase before switching to the second video stream (38). The manifest would then indicate a computational rule to compute addresses for fetching temporal segments of the first video stream and the second video stream, respectively. In case of using separate segments, the device 20 would offer the video to the client for retrieval additionally in form of a third video stream, namely the stream represent by layer L1. The device 20 would provide the client with a manifest describing an availability of the video for the client in the first spatial resolution in form of a third video stream L1, and in the second spatial resolution in form of the second video stream 38. The manifest then indicates that temporal segments of the first video stream, namely L2, are to be retrieved during the transition phase 64 along with temporal segments of the third video stream L1 when switching from the first spatial resolution to the second spatial resolution, i.e. between switching from the third video stream to the first video stream and then from the first video stream to the second video stream. The manifest indicates a computational rule to compute addresses for fetching temporal segments of the first, second and third video streams. It has been denoted above, that additionally, the video may be offered to the client at an additional third spatial resolution, even higher than the first spatial resolution, in form of a further video stream wherein it might be, however, that the second video stream 44 is coded alternatingly using closed and open GOP structure. Then, the device may be configured to offer the video to the client for retrieval additionally in form of the further video stream with the manifest describing the availability of the video for the client in the third spatial resolution, higher than the first and second spatial resolutions, in form of the further video stream, with indicating in the manifest the computational rule to compute addresses for fetching temporal segments of the further video stream, too, and the device 20 may inform the client on down-switching occasions for switching from the third to the second spatial resolution and up-switching occasions for switching from the first or third video stream to the second video stream separately as the may fall onto different time instances. Generally, for instance, down-switching may be allowed only at closed GOP structure random access points, while up-switching the second video stream is allowed at random access points of open GOP structures, too, namely in the above outlined manner using the first video stream L2 and obeying the time shift or transition phase length. The device 20 may indicates in the manifest that the first video stream L2 and the second video stream may be spliced together so as to be fed to one decoder. This may also be true for splicing together L1 and stream 38 in case of restricting down-switching to closed-GOP structures of L1.

Above embodiments then also revealed a device 50 for retrieving, using an adaptively streaming protocol such as, but not exclusively, DASH, a video 24, the device supporting switching between, at least, retrieving the video in form of a first video stream 36 and retrieving the video in form of a second video stream 38. It should be noted that in an alternative embodiment device 50 may even be able to work with a first video stream which merely corresponds to layer L1 of stream 36, for example, if device 50 would be designed to perform the upsampling 66 internally. Using the concept of a layered video stream 36 output from server to device 50 unburdens the device 50 and enables, in case of designing the second video stream 38 also by means of a further layered video stream as described above, an easy concatenation of stream 36 and 38 at the junction of switching from stream 36 to stream 38 so that the upsampling 66 is performed by the scalable video decoder. The device 50 is configured to schedule the transition phase 64 before switching from retrieving the video in form of the first video stream to retrieving the video in form of the second video stream. This provides enough time to substitute the RAM pictures using the upsampling 66.

As described above, the increased spatial resolution (second) video stream 38 may be a further layered video stream comprising a further first layer L1 having encoded thereinto the video at the first spatial resolution and a further second layer L2 having encoded thereinto the video at the second spatial resolution using temporal prediction in the open GOP structure and using inter-layer prediction from the further first layer L1 to further second layer L2 by way of inter-layer upsampling and using prediction residual coding. The first layer and the further first layer may have the video encoded thereinto equally coded at the first spatial resolution so that a reconstruction of the video on the basis of the layered video stream 36 and the further layered data stream 38, spliced together at a splicing point, at the first spatial resolution is equal to a reconstruction of the video at the first spatial resolution on the basis of any of the layered video stream and the further layered data stream, respectively. The first layer and the further first layer and the further second layer may be encoded using an open GOP structure. Switching back from stream 38 or the increased spatial resolution to stream 36 or layer L1 to obtain the reduced spatial resolution would be no problem as layer L1 would by continuously be decoded.

The increased spatial resolution (second) video stream 38 may also be a further layered video stream comprising a further second layer L2 having encoded thereinto the video at the second spatial resolution using temporal prediction in the open GOP structure and using prediction residual coding, but without inter-layer prediction. A layer L1 may be missing here at all. The first layer L1 of stream 36 may then be encoded using an closed GOP structure, i.e. using temporal prediction in GOPs where there are no RAD pictures. Switching back from stream 38 or the increased spatial resolution to stream 36 or layer L1 to obtain the reduced spatial resolution would be no problem as the open GOP structure allows for immediate playout after the switching without any reference picture having to be substituted.

The second layer and the further second layer of streams 36 and 38 may be labeled using a common layer ID so that splicing the layered video stream and further layered video stream results in a spliced layered video stream comprising a layer with the common layer ID having encoded thereinto the video at the second spatial resolution.

The device 20 may be configured to inform the client 50 that the client is to schedule a transition phase 66 before a switch from the first video stream 36 to the increased spatial resolution (second) video stream 38 in which phase the client is to derive a supplemental estimate of the video at the second spatial resolution by use of the second layer of the layered video stream, at least with respect to the RAM reference pictures. The length of the transition phase may exceed or equal a maximum distance between the pairs of RAD pictures and referenced RAM reference pictures. The information may be contained in the manifest. The device may be configured to obtain derive the length of the transition phase from an SEI of the increased spatial resolution video stream such as syntax element max_reference_poc_difference. In this regard, above description also revealed a video stream having encoded thereinto a sequence of pictures in a manner such as for example in a manner using temporal prediction in an open GOP structure an example of which was illustrated in FIG. 2, namely in a manner so that there is among the sequence of pictures at least one RAD picture which directly or indirectly references, by temporal prediction, a, in terms of presentation time order, succeeding RA picture of the sequence of pictures and a RAM reference picture preceding, in terms of presentation time order and decoding order, the random access point picture, wherein the video stream comprises a syntax element such as max_reference_poc_difference indicating a maximum temporal distance between the at least one random access dependent picture reference picture and the reference picture directly or indirectly referenced by the at least one random access dependent picture. The video stream may be a layered video stream and the sequence of pictures the pictures of one of the layers of the layered video stream. Stream 38, for instance, may be such a video stream. A video encoder which encodes the sequence of pictures correspondingly into the video stream may insert the syntax element into the data stream. Such an encoder is illustratively depicted in FIG. 2 at 19. The syntax element is, thus, an information indicating the maximum temporal distance. It may measure the distance in POCs (picture order counts) or some other suitable unit.

Layer L1 and layer L2 of stream 36 may be individually retrievable by the client 20 or individually output by device 20, respectively. In other words, device 20 may support switching between, at least, outputting the video in form of the layered video stream 36 including both L1 and L2 by the client fetching the segments $36^1_i$ and $36^2_i$ of both layers L1 and L2, outputting the video in form of the second video stream 38, and outputting the video in form of a reduced spatial resolution stream having encoded thereinto the video at the first spatial resolution. The latter option may correspond to the client 50 retrieving merely the segments concerning layer L1 of stream 36. That is, device 50 would by enabled to retrieve the layered video stream 36 in temporal segments $36^1_i$ and $36^2_i$ separately containing the first and second layers L1 and L2, and device 50 may refrain from retrieving temporal segments $36^2_i$ containing the second layer L2 along with the segments $36^1_i$ concerning layer L1 outside the transition phase. It should be noted that, alternatively, separate segments conveying a reduced spatial resolution video stream, equally coded as layer L1 of stream 36 or even differently coded, may be provided for download at device 20 as well.

Layer L1 and layer L2 of stream 36 may be retrievable by the client 20 or output by device 20, respectively, merely together in common segments $36_i$. The device 50 would then retrieve the layered video stream in temporal segments containing the first and second layers. The device 50 may restrict subjecting the second layer to decoding along with the first layer to a time during the transition phase. Outside the transition phase, merely the first layer L1 may be subject to decoding, despite layer L2 being conveyed, too, within the segments of stream 36 retrieved.

On the other/client side, as described above, device 50 may subject the first video stream 36 and second video stream 38 in a manner stitched together to decoding by, for example, a scalable decoder such that pictures decoded from the first video stream 36 form, for RAD pictures of the second video stream 38, a substitute of the RAM reference pictures referenced by the RAD pictures.

Device 20 may send to device 50, and device 50 may obtain from device 20, an information of a length of the transition phase in, for example, units of segments or temporal units. Additionally or alternatively, a signalization may be sent from device 20 to device 50 and with device 50, depending on the signalization, deactivating the scheduling or activating the scheduling. Thus, device 50 would be able to retrieve another video from the same server or a different one, also with switching between two video stream, but without scheduling of a transition phase before switching from one to another video stream as it would be possible without penalties with open GOP structure encoded video streams. Information and/or signalization may be contained in the manifest.

The aspect of the present application for which embodiments are described next pertains to the aspect which enables to code a dependent representation for adaptive streaming in a manner such that merely a subset of the temporal segments of this dependent representation necessitate an output or retrieval of the temporally corresponding segments of the representation referenced by the dependent representation to/by the client device. Before these embodiments are described, a brief description of advantages which may result therefrom is provided.

It is well-known that existing scalable video coding techniques come along with a non-negligible coding efficiency penalty in comparison to the corresponding single layer codec. At the same time, even though scalable codecs have this disadvantage, there are some use-cases in which scalable codecs provide some capabilities that make them very attractive to use.

Figure 14:
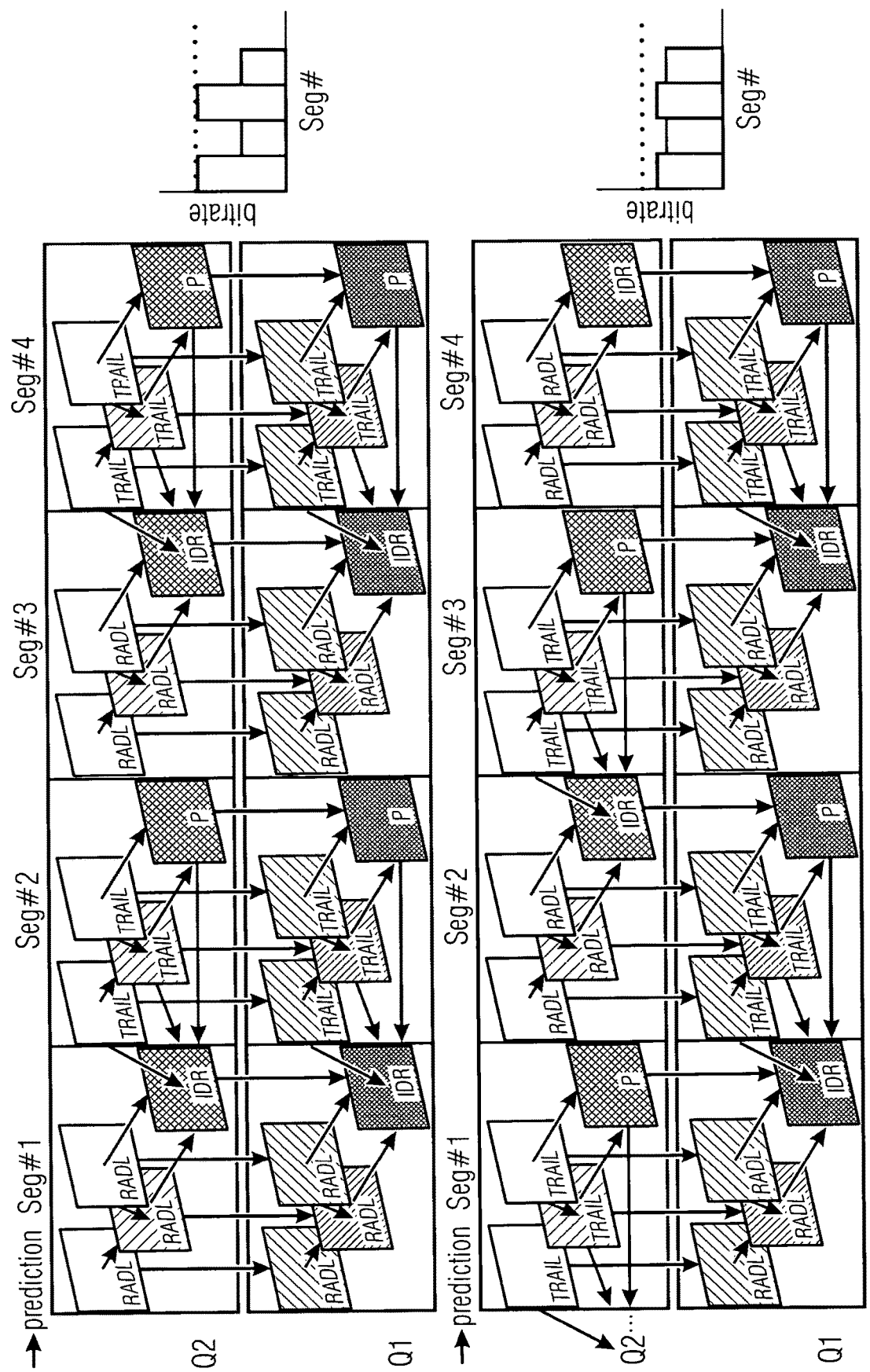
FIG. 14 shows a schematic diagram illustrating four consecutive segments of two representations, representation Q2 being dependent on representation Q1, wherein in the upper half, an example is shown where the segments carrying RAPs are temporally aligned, and in the lower half it is illustrated that the segments are non-aligned, with showing the resulting download bitrate at downloading representation Q2, thereby illustrating the lower bitrate peaks in case of using non-aligned RAPs.

For instance, scalable codecs allow for an unequal random access as well as non-aligned Random Access Points (RAPs), the latter allowing for a better distribution in time of the bitrate at the random access points compared to offering the same functionality with aligned RAPs. FIG. 14 illustrates the described issue with aligned RAPs shown in the top half of FIG. 14 and non-aligned RAPs shown in the bottom half of FIG. 14. The associated bitrate over segment distribution is depicted on the right hand side respectively for aligned RAPs and non-aligned RAPs. As can be seen in FIG. 14, in case of aligned RAPs, the random access pictures, here IDR pictures, are contained in temporally aligned temporal segments of representations Q1 and Q2, namely the first and third segment so that the bitrate of a stream conveyed from server to client shows bitrate peaks corresponding to these temporal segments of the video. In case of non-aligned RAPs, the situation is less severe. Here, the RAPs, e.g. IDR pictures, are arranged within temporal segments which are not temporally aligned when comparing representation Q1 and Q2. The random access point pictures of representation Q1 are contained within segments Seg #1 and Seg #3, whereas the random access pictures of representation Q2 are arranged within temporal segments Seg #2 and Seg #4. When transmitting the video content from server to client at representation Q2, the temporal variance of the bitrate of the stream sent from server to client is reduced. That is, the bitrate peaks are less significant compared to the case of aligned RAPs.

However, since typically a higher number of random access points in the lower layers, namely base layer with Q1 in the example of FIG. 14, than in higher layers, namely enhancement layer with Q2 in FIG. 14, is desired to allow for a fast tune-in, the scalable stream is going to come along with a reasonable high compression overhead in comparison with the single layer case, making the thus described solution at the bottom half of FIG. 14 less appealing.

It would accordingly be desirable to offer content that allows distributing the bitrate needed to providing random access over time but avoid the compression overhead penalty, especially in the described case with frequent RAPs in the base layer.

Figure 15:
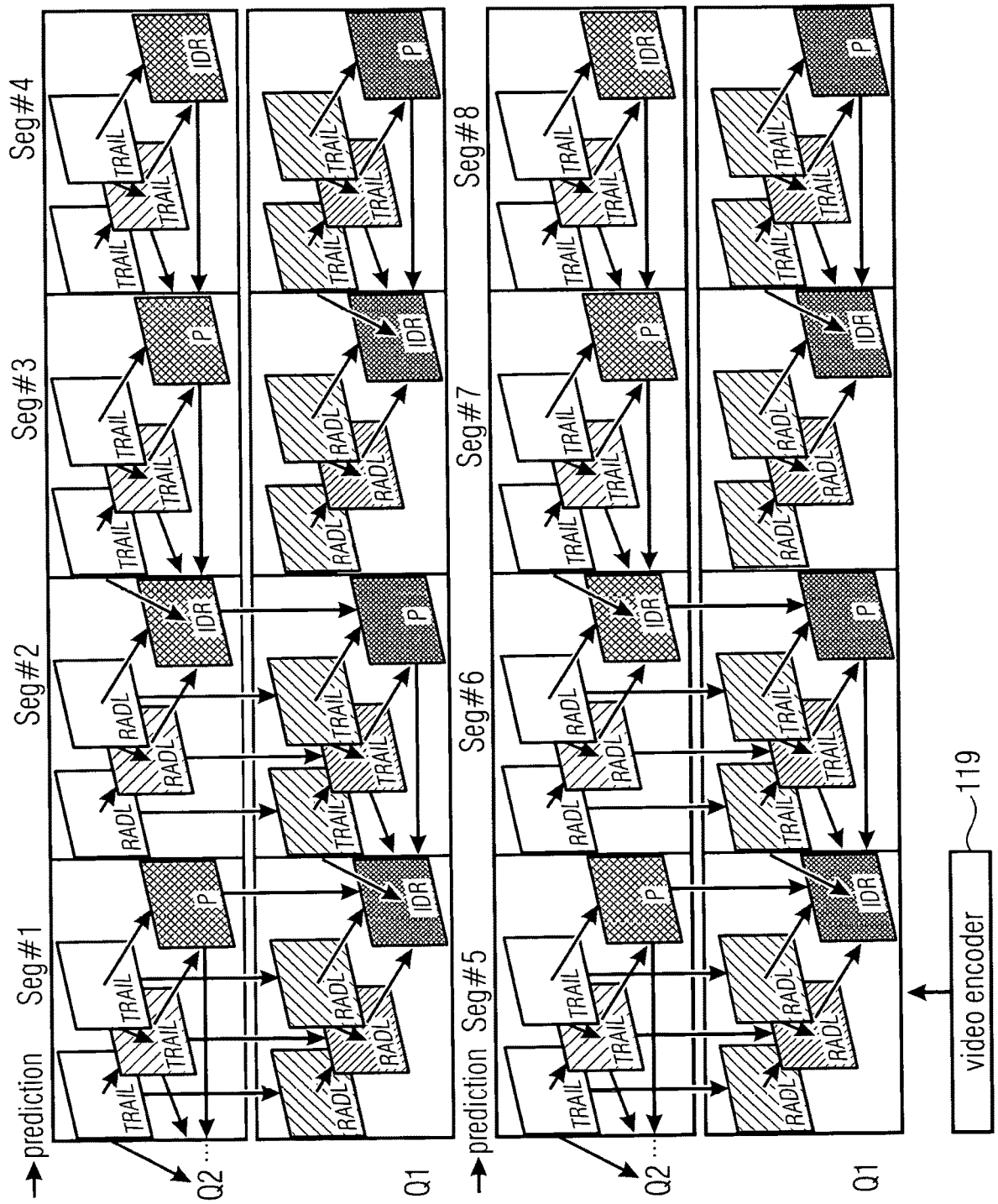
FIG. 15 shows a schematic diagram illustrating eight consecutive segments in case of a representation Q2 being dependent on a representation Q1 with coding some of the segments of representation Q2 in a manner independent from representation Q1.

FIG. 15 illustrates an advantageous embodiment of media content as rendered available for retrieval by a client at a server. As in the other embodiments described so far, the media content is assumed to be a video, but the media content could alternatively be something else such as, for example, audio content or the like. The media content is available at a first bitrate and quality Q1 and a second bitrate and quality Q2. The second bitrate is increased relative to the first bitrate just as the quality Q2 relative to Q1 is. Representation Q1 is formed by a base layer. The base layer is temporally subdivided into eight temporally consecutive segments. Eight such consecutive segments are illustrated in FIG. 15. The first, third, fifth and seventh segments contain a random access point, here in the form of an IDR picture, and thus allow. for a tune-in. The second representation Q2 is coded by way of an enhancement layer coded in a manner dependent on the base layer. The enhancement layer is also temporally subdivided into temporal segments which are temporally aligned to the temporal segments of representation Q1. However, among these temporal segments of representation Q2 merely a subset is coded in a manner dependent on the temporally corresponding temporal segment of the base layer. For instance, the third, fourth, seventh and eighth segments shown in FIG. 15 among representation Q2 are coded in a manner depending on the respective preceding segment of representation Q2, but independent from the temporally co-located temporal segments of the base layer. A client which is interested in retrieving the media content at representation Q2 accordingly does not need to download all temporal segments of the base layer in addition to the temporal segments of representation Q2 in order to obtain the media content at quality Q2. Rather, the client may leave-off a retrieval of the third, fourth, seventh and eighth segments of representation Q2.

Accordingly, in accordance with an embodiment of the present application, the manifest or media presentation description sent from server to client could be extended to signal the mixture of layered and single layer coding as illustrated in FIG. 15 to the client so that the latter is able to skip downloading unneeded segments of the reference representation.

The current DASH specification, for example, treats different scalable layers as so-called representations. Currently, DASH only describes coding dependencies comparatively coarsely based on representations. Using the coding described further below would induce a lot of unnecessary traffic of non-necessary base layer segments as some enhancement layer segments are, when encoded according to FIG. 15, encoded in a way that single layer coding performance is achieved and no inter-prediction is applied. Hence, in accordance with an embodiment of the present application, the syntax element @dependencyId in DASH may, for example, be extended with additional attributes that allow for signaling a segment-wise dependency to indicate only the obligatory segments so that users can avoid downloading the non-required base layer segments. With respect to the embodiment of FIG. 15, a client would be able to download segments #1, #2, #5 and #6 from Q1 and Q2 while merely segments #3, #4, #7 and #8 of representation Q2 are downloaded, i.e. enhancement layer.

An example of attributes using which such a manifest could be construed are presented in the table below. It contains @dependencyPattern which provides the client with the ability to pick out those base layer base layer segments rarely needed for a certain enhancement layer representation.

| Element or Attribute Name | Use | Description |
| --- | --- | --- |
| Representation | | This element contains a description of a Representation. |
| @id | M | specifies an identifier for this Representation. The identifier shall be unique within a Period unless the Representation is functionally identically to another Representation in the same Period. The identifier shall not contain whitespace characters. If used in the template-based URL construction as defined in 5.3.9.4.4, the string shall only contain characters that are permitted within an HTTP-URL according to RFC 1738. |
| @bandwidth | M | Consider a hypothetical constant bitrate channel of bandwidth with the value of this attribute in bits per second (bps). Then, if the Representation is continuously delivered at this bitrate, starting at any SAP that is indicated either by @startWithSAP or by any Segment Index box, a client can be assured of having enough data for continuous playout providing playout begins after @minBufferTime * @bandwidth bits have been received (i.e. at time @minBufferTime after the first bit is received). For dependent Representations this value shall specify the minimum bandwidth as defined above of this Representation and all complementary Representations. |
| @qualityRanking | O | specifies a quality ranking of the Representation relative to other Representations in the same Adaptation Set. Lower values represent higher quality |

| Element or Attribute Name | Use | Description |
|---|---|---|
| | | content. If not present then no ranking is defined. |
| @dependencyId | O | specifies all complementary Representations the Representation depends on in the decoding and/or presentation process as a whitespace-separated list of values of @id attributes.<br>If not present, the Representation can be decoded and presented independently of any other Representation.<br>This attribute shall not be present where there are no dependencies. |
| ... | ... | ... |
| @dependencyPattern | O | specifies which segments of a complementary Representation are needed as a whitespace-separated list of values integers.<br>The first integer indicates the pattern size. The following integers up to a ";" indicate which segment index in the pattern size correspond to a needed segment. If there is more than one complementary Representation as many patterns as complementary Representations are included separated by ";". |
| *CommonAttributesElements* | — | Common Attributes and Elements (attributes and elements from base type *RepresentationBaseType*), for more details see 5.3.7 |
| ... | ... | ... |

Legend:
For attributes: M = Mandatory, O = Optional, OD = Optional with Default Value, CM = Conditionally Mandatory.
For elements: <minOccurs> ... <maxOccurs> (N = unbounded)
Elements are bold; attributes are non-bold and preceded with an @, List of elements and attributes is in italics bold referring to those taken from the Base type that has been extended by this type.

In the example of FIG. 15, for instance, the attribute would read as:
@dependencyPattern=4 1 2
which would mean that any segment with index 1+4*n or 2+4*n is needed for decoding. Therefore, all other segments not having this index could be not downloaded improving the downloaded bitrate in comparison to using only @dependencyId.

In addition to signaling the dependency or non-dependency of segments in a more granular way, non-aligned RAPs help to distribute the bitrate over time. A further embodiment consists of signaling an offset on RAPs for different representations. @rapOffset or @switchingOffset.

Finally, an attribute describing the saved throughput can be added to the MDP @savedBandwidth to modify the described @bandwidth attribute meaning when the non-dependent segments from the complementary representation (i.e. the representations on which a given Representation depends on) are not downloaded.

Figure 16:
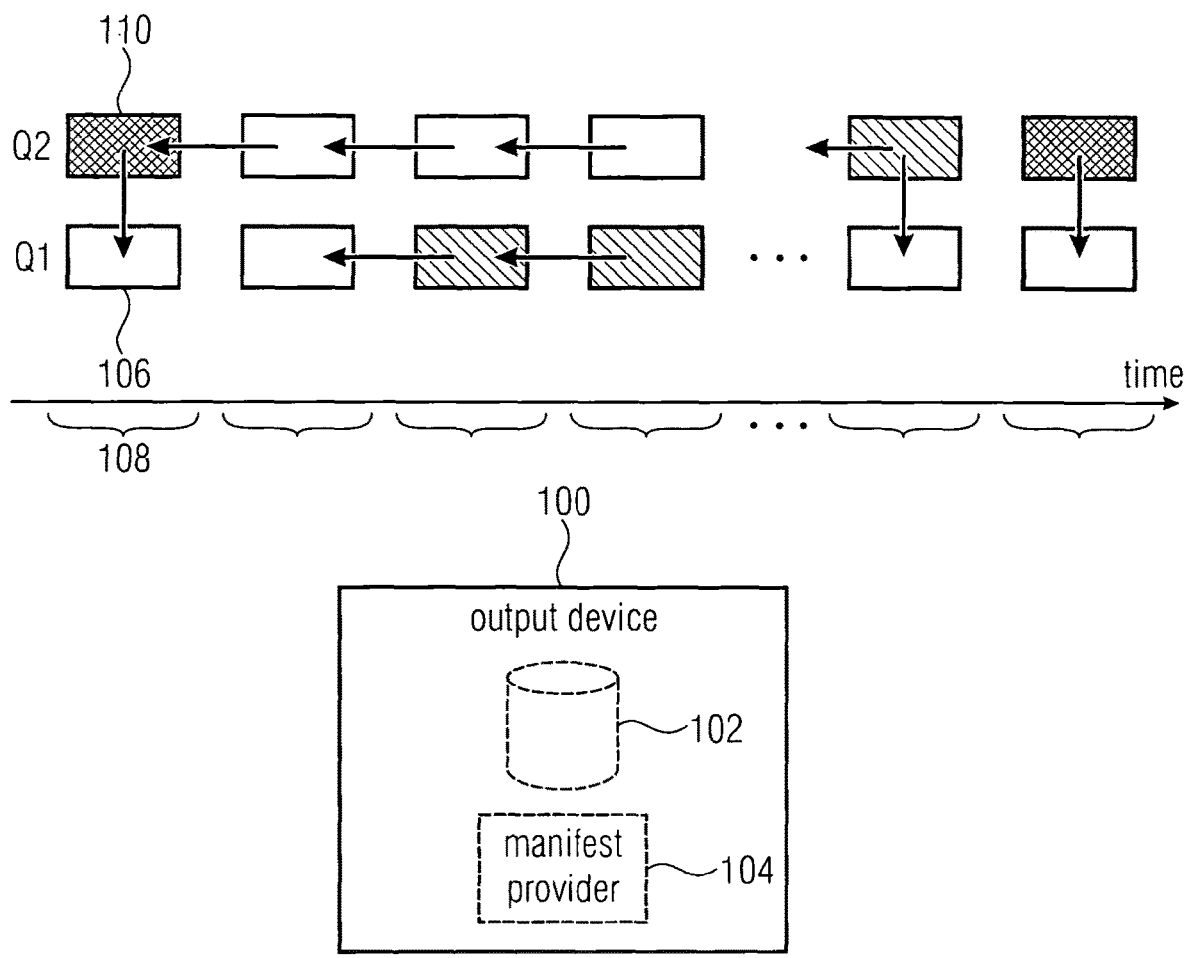
FIG. 16 shows a schematic diagram illustrating an output device which may take advantage of the structure shown in FIG. 15.

FIG. 16 shows an embodiment for a corresponding output device or server and the associated data structure it may render available for download by a client. The output device of FIG. 16 is illustrated using reference sign 100 and may be implemented in hardware, firmware or software in the manner outlined above with respect to FIG. 4. Internally, the output device may be constructed like the output device described with respect to FIG. 4, i.e. it may comprise a storage 102 an a manifest provider 104. As described with respect to FIG. 15, output device 100 outputs, or allows the download of, a media content via an adaptive streaming protocol at varying bitrate. For example, output device 100 offers to the client a switching between a first and a second bitrate associated with a first and second representation, respectively. The representations may correspond to layers of a layered codec. In FIG. 16, the representation corresponding to higher bitrate and higher quality is denoted Q2 while the representation corresponding to lower bitrate and lower quality is denoted Q1. Representation Q1 is thus a sequence of temporal segments 106 of a media data stream which represent, respectively, a corresponding time portion of a sequence of time portions 108 of the video content at the respective quality Q1. Some of these segments 106 may be suitable for a media playout or tune-in. That is, they may be coded independent from any preceding segment of representation Q1. Other segments of representation Q1 may depend on temporally preceding segments. The latter ones are shown in hatched in FIG. 16. Likewise, representation Q2 may also be formed by a sequence of temporal segments of a data stream. These segments are denoted 110 in FIG. 16 and have encoded therein a respective one of the temporal portions 108 of the media content, respectively. However, segments 110 include ones coded dependent on the temporally aligned segment 106 of representation Q1 and ones which are coded independent from the temporally corresponding segment 106 of representation Q1. The former ones are shown hatched in FIG. 16. The other ones are depicted in FIG. 16 non-hatched and may have encoded thereinto the respective temporal portion 108 of the media content in a manner dependent on a preceding one of the segments 110. Among those segments 110 which are coded dependent on a corresponding temporally aligned segment 106 of representation Q1, some may be coded independent from any preceding segment 110 of quality Q2, which are shown cross-hatched in the case of FIG. 16, while others depend on previous segments 110.

The output device 100 may have stored the data structure in the form of temporal segments 106 and 110 within a storage 102. Each of segments 106 and 110 may have associated therewith a unique address which a client may compute on the basis of the manifest which manifest provider 104 outputs to the client. The manifest may also including a description of representations Q1 and Q2 in terms of, for example, bitrate needed for downloading the respective representation and the quality at which the respective representation represents the media content. For example, the quality may correspond to the spatial resolution at which a certain representation represents a video as an example of media content.

Figure 17:
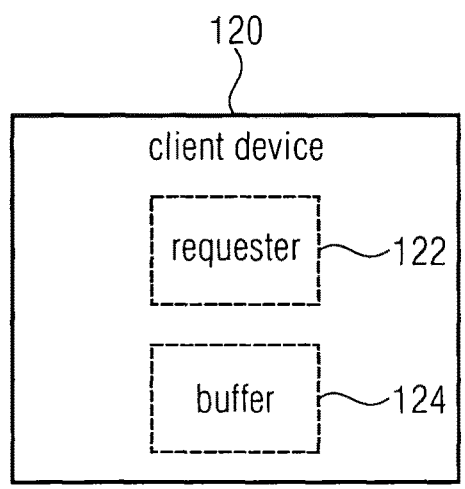
FIG. 17 shows a schematic diagram illustrating a client device which may fit to the output device of FIG. 16.

FIG. 17 shows a client device 120 which may be implemented in hardware, firmware or software, as it has been described with respect to FIG. 6. Internally, the client device may comprise a requester 122 and a buffer 124. The client device 120 of FIG. 17 is configured to, according to an adaptive streaming protocol, communicate with output device 100 to retrieve or download the media content. If client device 120 seeks, for example, to download the media content at representation Q1, client device 120 sequentially requests by requester 122 the sequence of segments 106 of representation Q1 from output device 100. Requester 122 would compute the addresses of segments 106, for instance, on the basis of a corresponding segment template signaled within the manifest which output device 100 sends to client device 120 upon a corresponding request by requester 122. Buffered by buffer 124, client device 120 would forward the thus retrieved sequence of segments 106 to a media decoder such as video decoder in case of the media content being a video.

In the case of being interested in representation Q2 of the media content, however, client device 120 would skip retrieving representation Q1 with respect to those segments of representation Q2 which are coded independent from representation Q1. That is, client device 120 would retrieve or download from output device 100 the sequence of segments 110 of representation Q2 along with merely those segments of representation Q1 which are temporally aligned to segments 110 coded dependent on representation Q1. Client device 120 would, accordingly, refrain from downloading or retrieving those segments 106 of representation Q1 temporally aligned to the non-hatched segments 110 shown in FIG. 16.

As described previously, the manifest sent from output device 100 to client device 120 could comprise an information on a deterministic periodic manner at which segments 110 of the second representation being coded independent from representation Q1 are temporally interleaved with segments 110 of representation Q2 which are coded dependent on representation Q1. Further, the manifest sent from device 100 to device 120 may comprise one or more segment templates on the basis of which client device 120 is enabled to compute the unique addresses of segments 106 and 110. Using the segment template and the periodic information, client device 120 and requester 122, respectively, are enabled to specifically download merely the needed ones of segments 106 and 110. The manifest may indicate as a bitrate for representation Q2 a bitrate resulting from downloading merely the just-mentioned needed ones among segments 106 and 110. Alternatively, output device 100 may treat the skipping of non-needed ones of the segments 106 of representation Q1 as optional and indicate within the manifest two bitrates for representation Q2: one for the case that all segments 106 of representation Q1 are downloaded in addition to segments 110, and the other one for the case that the non-needed ones among segments 106 of representation Q1 are skipped and not downloaded in addition to segments 110.

In accordance with an alternative embodiment, message boxes in file headers of segments 110 may be used in order to signal from output device 100 to client device 120 for one or more subsequent segments 110 whether or not the latter ones depend on, and therefore involves downloading, the temporally corresponding segments of representation Q1. By this measure, the output device 120 would act as follows: the client device 120 would inspect the manifest and decide, for example, to download representation Q2, at the beginning, client device 120 may start with downloading a first segment of representation Q2 in line along the temporally corresponding segment 106 of representation Q1. The manifest may, for example, comprise a hint that informs the client device 120 about the presence of the message boxes that indicate whether the following segment of Q2 needs the temporally corresponding segment of Q1 or not. Client device 120 would then inspect a message box within this segment 110 in order to check for one or more subsequent segments 110 in line whether or not for same the respective temporally corresponding segment 106 of representation Q1 also has to be retrieved/downloaded. The ones 106 needed would be downloaded/retrieved by the client device 120. In this manner, client device 120 would inspect the message boxes of subsequent segments 110 to check for further segments 110 whether same need or do not need the retrieval/download of the respective temporally corresponding segments 106 of representation Q1.

Thus, above embodiments revealed, a device 100 for outputting, using an adaptively streaming protocol, such as, but not exclusively, DASH, a media content to a client. The media content is not restricted to video, but could alternatively be audio data or other media data. The device 100 supports switching in units of temporal segments 108 between, at least, a first representation Q1, and a second representation Q2 having encoded thereinto the video dependent on the first representation Q1, wherein the device 100 provides the client with an information discriminating between a first (hatched in FIG. 16) set of temporal segments 110 of the second representation which has encoded thereinto the media content dependent on first portions of the first representation temporally corresponding to the first set of temporal segments, i.e. the segments 106 of Q1 temporally aligned to the hatched segments 110, and a second (non-hatched in FIG. 16) set of temporal segments 110 the second representation Q2 has encoded thereinto the media content independent from second portions of the first representation temporally corresponding to the second set of temporal segments, i.e. the segments 106 temporally aligned with the non-hatched segments 110. So, a successful reconstruction of the media content from the second representation gets along without the second portions the first representation, i.e. the reconstruction is feasible without the latter segments 106.

A corresponding device 120 for retrieving, using the adaptively streaming protocol, the media content which supports switching in units of temporal segments between, at least, retrieving the first representation of the media content and retrieving the second representation of the media content, has been described above as being configured to, when retrieving the second representation, retrieve the first set of temporal segments of the second representation along with the first portions of the first representation, and retrieve the second set of temporal segments the second representation without the second portions of the first representation.

A computational rule may be agreed between both devices 100 and 120 to be used by client device 120 to discriminate between addresses of temporal segments of the first representation lying within the first portions and second portions respectively. It may derive the computational rule from the manifest sent from device 100 from which the media content is retrieved. Accordingly, above embodiments also revealed a manifest for use in an adaptively streaming protocol, describing a media content, the manifest describing the media content as being available in form of a first representation of the media content, and a second representation having encoded thereinto the media content dependent on the first representation, wherein the manifest comprises an information discriminating between a first set of temporal segments of the second representation has encoded thereinto the media content dependent on first portions of the first representation temporally corresponding to the first set of temporal segments, and a second set of temporal segments the second representation has encoded thereinto the media content independent from second portions of the first representation temporally corresponding to the second set of temporal segments so that a successful reconstruction of the media content from the second representation gets along without the second portions the first representation.

Additionally or alternatively, hints in predetermined temporal segments of the first and/or second sets of temporal segments of the second representation, such as within file boxes, may allow the device 120 to attribute one or more subsequent temporal segments of the second presentation subsequent to the predetermined temporal segments to one of the first and second sets of temporal segments. A data structure representing a media content and conceptualized for streaming, using an adaptively streaming protocol, the media content to the client, the data structure comprising the first representation of the media content, and a second representation having encoded thereinto the media content dependent on the first representation, wherein the data structure comprises an information discriminating between a first set of temporal segments of the second representation has encoded thereinto the media content dependent on first portions of the first representation temporally corresponding to the first set of temporal segments, and a second set of temporal segments the second representation has encoded thereinto the media content independent from second portions of the first representation temporally corresponding to the second set of temporal segments so that a successful reconstruction of the media content from the second representation gets along without the second portions the first representation. Here, the media content may comprise the manifest or the hints in predetermined temporal segments of the first and/or second sets of temporal segments of the second representation.

Before turning to the next aspect of the present application, it should be noted that the media content, such as video, may be provided to the output device or server in a manner so that the latter is provided with the information which enables it to derive the interleaving of inter-representation dependent and intra-representation coded temporal segments, i.e. their order at which same alternatingly occur in the sequence of temporal segments of stream Q2. In other words, a layered video stream may have encoded thereinto a video in layers L1 and L2 corresponding to Q1 and Q2 in FIG. 14, in the manner that the sequence of pictures comprises, in an alternating manner, subsequences of pictures coded independent from any other layer, i.e. without inter layer prediction, and subsequences of pictures coded dependent from another layer such as L1, i.e. using inter layer prediction, and this layered video data stream may comprise an indication about this alternation of subsequences so that the output device may inform the client accordingly, namely by subdividing the layered video stream into temporal segments along time and between the layers so as to obtain the segments illustrated in FIG. 14 by the 16 rectangles, for instance, with or without taking the indication in the layered video stream into account and appointing each temporal segment an inter-representation dependent segment or an intra-representation coded temporal segment according to the indication in the video stream. In particular, those temporal segments only comprising, or having encoded thereinto, pictures within one of the runs of intra-layer coded pictures as indicated in the layered video stream would become non-hatched ones in FIG. 16, i.e. intra-representation coded segments of Q2, while all other segments into which layer L2 of the layered video stream is temporally subdivided become hatched ones of representation Q2 in terms of FIG. 16.

In other words, the dependency information of video representations with temporal segment wise granularity to be indicated on transport level in the above embodiments may only be derived through a side channel information from the encoder or by parsing and analyzing the complete video bitstream, i.e. all indicated layer dependencies, reference picture sets and the actual usage of inter layer prediction over time. It is convenient to provide means for an encoder to directly convey this information within the video bitstream in an readily available fashion. The following exemplary syntax allows for this functionality as an SEI message.

| InterLayerPredictionIndication( payloadSize) { | Descriptor |
| --- | --- |
| num__AUs | ue(v) |
| num__ref__layers | ue(v) |
| for (refLayer=1; refLayer <=num__ref__layers; refLayer ++) { | |
| ref__layer__layer__identifier[refLayer] | u(5) |
| ilp__idc[refLayer] | ue(v) |
| } | |
| } | |

For a given layer, the layer's inter-layer prediction dependencies to the reference layers are descripted/guaranteed/indicated for the scope of the SEI. The scope lasts until the next occurrence of the SEI (when num_AUs=0) or for an explicit given amount of access units (otherwise). The value of ilp_idc indicates whether there are no ILP dependencies between the expressed layers during the scope of the SEI. That is, an SEI would indicate for all following pictures of a certain layer i until the next SEI of that type as to which layers j<i the coding of this layer i into the layered video stream depends on exclusively. This runs of pictures forms then a run or subsequence of pictures using the above nomenclature, and a next run or subsequence of pictures would be commenced by way of the next SEI which may change the set of referenced layers layer i depends on. A video encoder as it is illustrated using reference sign 119 in FIG. 16 may provide a layered video stream with such an information and a network device such as device 120 may use red the information and apply each SEI message, for instances, onto those pictures which span the subsequence of pictures from the respective SEI messages onwards to the next SEI message.

The embodiments described next are concerned with a further aspect of the present application, namely the aspect of distributing random access points in a multi-channel signal in a space spanned by the channels themselves on the one hand and the representations on the other hand. As before with the other aspects of the present application, the description starts with an introduction which explains the underlying problem.

Random access points are typically used in streaming systems, since they allow for a tune-in into a stream at different points either for a live service or a seeking functionality and at the same time can be used as switching points in a dynamic adaptive streaming session where the media bitrate needs to be adapted to the available throughput measured from the network.

Optimizing the frequency of random access points is at the end a trade-off between coding efficiency and random access capability. Also, the more frequent the RAPs are, then the closer to the live event can a user tune-in in a live scenario.

In addition to the coding efficiency, in a low delay scenario where the client buffer is kept as low as possible, the peak-bitrate cannot be really absorbed by the buffer and can result in a user optimizing its operation point based on the peak bitrates. At the same time, in a DASH scenario, segments might be kept as small as possible (e.g. GOP sized), so that the server-side delay is reduced. In such an environment not all segments would be encoded starting with a RAP, leading to segments with a high variability in sizes over time: segments containing RAPs would be much bigger than segments not containing RAPs.

Figure 18:
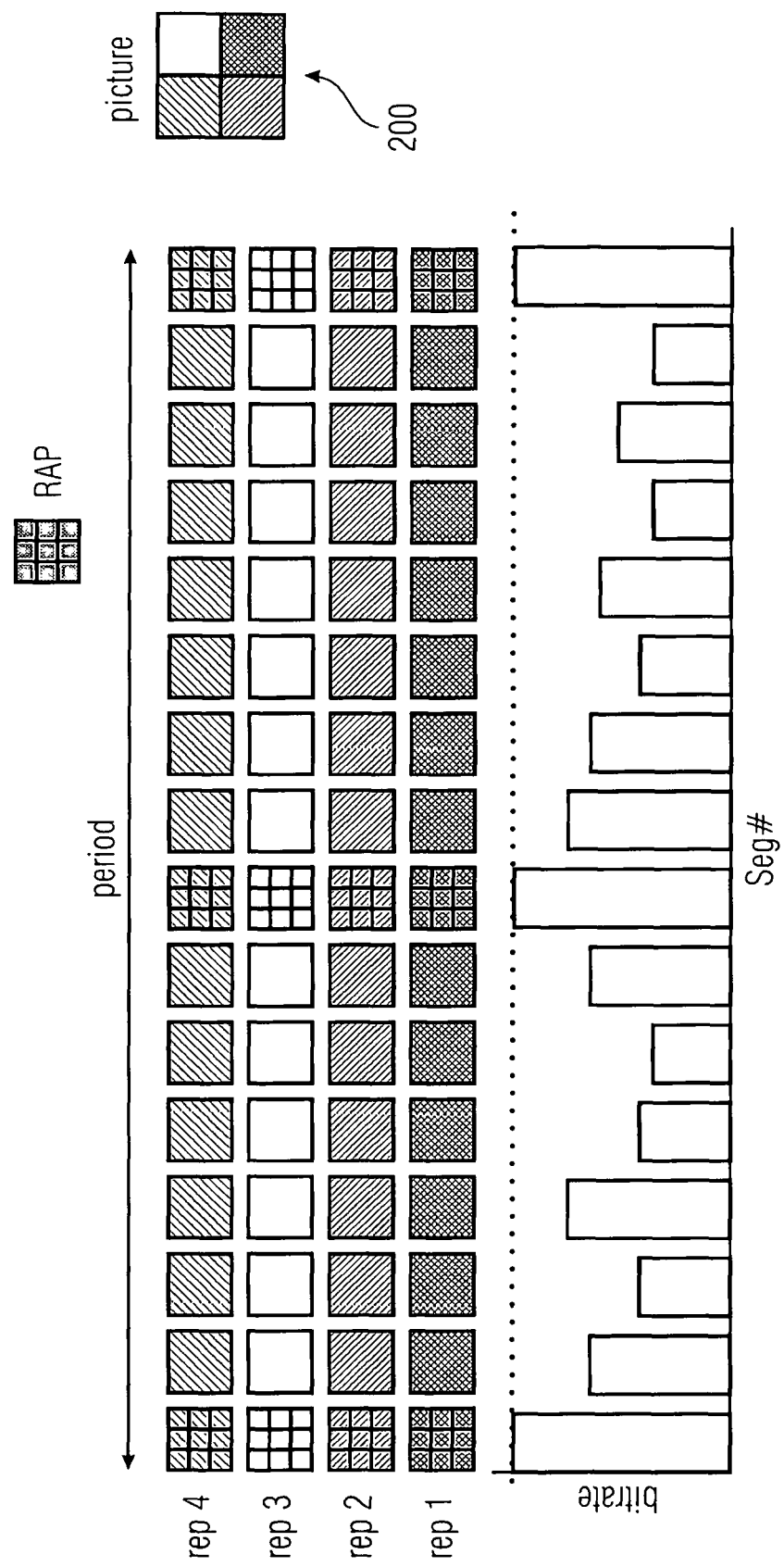
FIG. 18 shows a schematic diagram illustrating a case of having one representation per section of a common feature scene with temporally aligned RAPs in the representations with showing the resulting bitrate peaks in downloading the complete scene.

Users would have then to select the desired quality for the worst case scenario, i.e. biggest segments which correspond to the ones containing RAPs. The issue with the segment size variability is depicted in FIG. 18. FIG. 18 shows a case where four representations offered by a certain server correspond to four different tiles or portions of one scene as depicted at 200 at the right hand side of FIG. 18. Each representation is composed of a sequence of temporal segments being arranged in FIG. 18 along the temporal order from left to right, for example.

Segments containing an RAP are depicted as a 3×3 array. As shown at the bottom of FIG. 18, transmission of all representations to a client results in a time-varying bitrate with bitrate peaks associated with the temporal segments containing RAPs, which in the example of FIG. 18 are temporally aligned among representations 1 to 4.

Gradual decoding refresh (GDR) is a technique that allows an encoder to distribute the refreshing (restarting) of coding prediction over time (or pictures in the bitstream), e.g. by breaking prediction at different points in time for different spatial regions of a picture. A simple way to provide such a functionality is to encode the video using tiles and use scattered RAPs in time, by distributing the RAPs or prediction breaking (prediction-resetting) pictures into different (sub)segments. Simply doing this at the server-side would not allow to have as many ("clean"-for the whole picture) random access points. Thus, temporally distributing segments containing an RAP over representations, each of which concerns another channel of a common scene, such as a corresponding section of a scene, does not solve the problem of bitrate peaks very satisfactorily, as in fact by this measure the erstwhile "common" or time-aligned random access points of the various channels are merely temporally smeared-out while leaving the tune-in rate into the whole scene or media content as it is. In accordance with the embodiments described subsequently, it is possible to lower the bitrate peak problem and to lower the tune-in time needed for a client.

Figure 19:
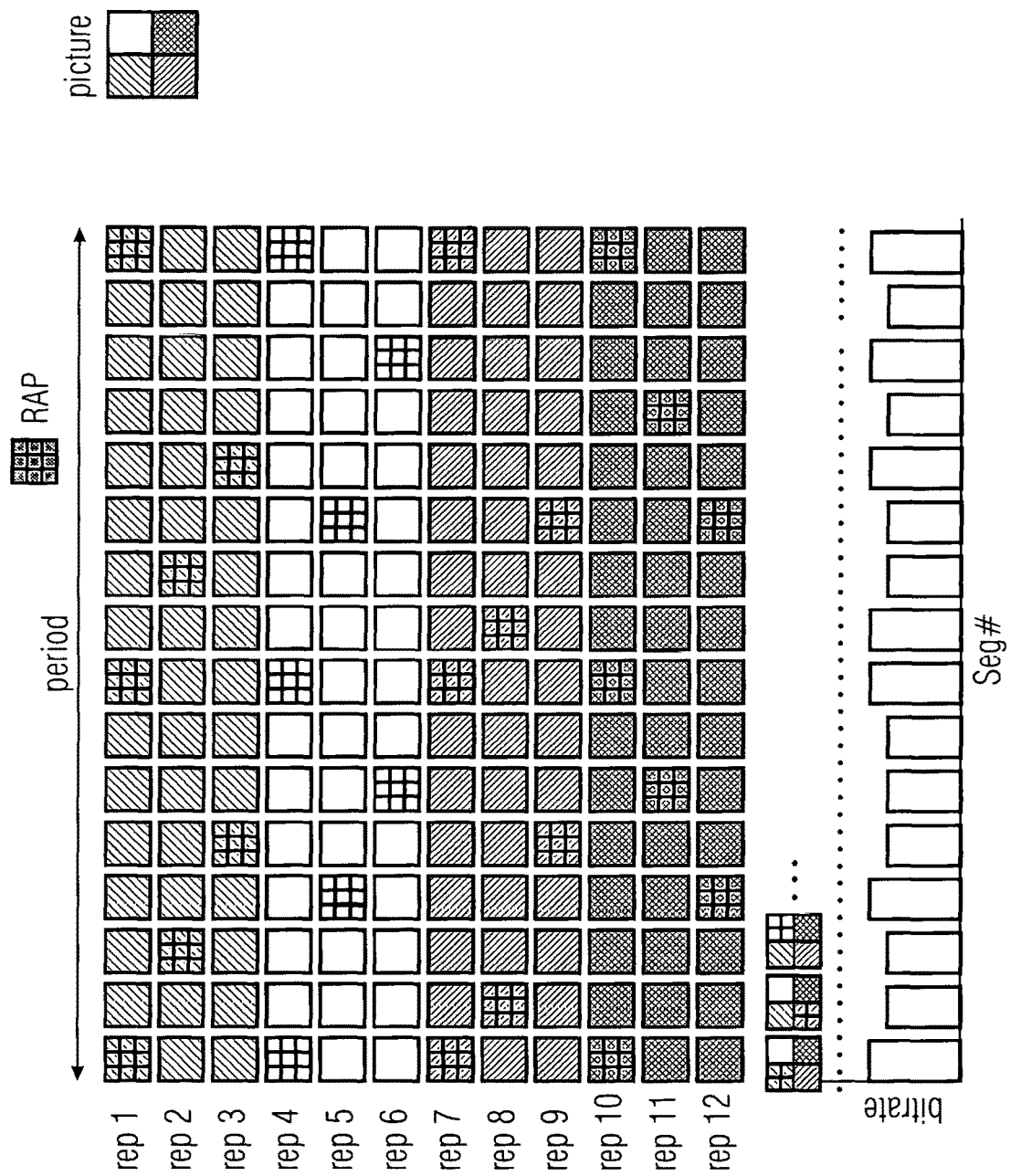
FIG. 19 shows a schematic diagram illustrating an improved media scene structure of having several representations of differently temporally distributed RAPs for each channel of a multi-channel media scene.

The solution applied by the subsequently explained embodiments is first explained with respect to FIG. 19 which uses the same example as FIG. 18 as an example for multiple channels of a media scene, namely four different sections of a scene. In the example of FIG. 19, three representations are provided for each channel, namely the first three representations for the first channel corresponding to the upper right section of the scene, representations 4 to 6 for the second channel pertaining to the upper right hand section of the scene, representations 7 to 9 correspond to the third channel pertaining to the bottom left hand side section of the scene and representations 10 to 12 are spent for the fourth channel pertaining to the bottom right hand section of the scene. A client which is interested in retrieving the complete scene thus needs to retrieve one of the representations for each channel. The fact that for each channel more than one representation is available provides the client with the opportunity to specifically visit, for a certain temporal segment, those representations of the channels including RAPs, such as for instance for a fast tune-in, or to visit representations, a mean number of which has, at the respective temporal segment, an RAP so that a mean number of temporal segments containing an RAP downloaded for the four channels is substantially constant over time, thereby assisting in keeping the temporal bitrate variance for streaming the temporal segments of the channels from server to the client reasonably low.

It can be seen how the downloaded bitrate is more homogeneous over time than in the previous case.

Needed signaling in MPD:
First Embodiment
   RAP offset or similar
      @rapOffset or @switchingOffset as defined above
      It can be used for the tiled use case as depicted above or for fast tune-in with scattered RAPs/Switching points. Thus the bitrate of each representation is smaller but same granularity as more frequent RAPs/Switching Points
      Signaling that they are equivalent representation.
Second Embodiment
   aligned RAP only needed for tune in→offer only scattered RAPs Reps and additional "non-full" Reps with aligned RAPs with drift
Third Embodiment
   peak rate reduction measurements
      an attribute describing the @peakBitrateReduction. The peak bitrates can be derived using @minBufferTime and @bandwidth. The scheduler will work based on this derivation of the peak bitrate. Such an attribute helps for the scheduler to take the real distributed rate into account. This can help extending the time at high quality stream. Still aligned RAPs can be used for switching or random accessing.

Figure 20:
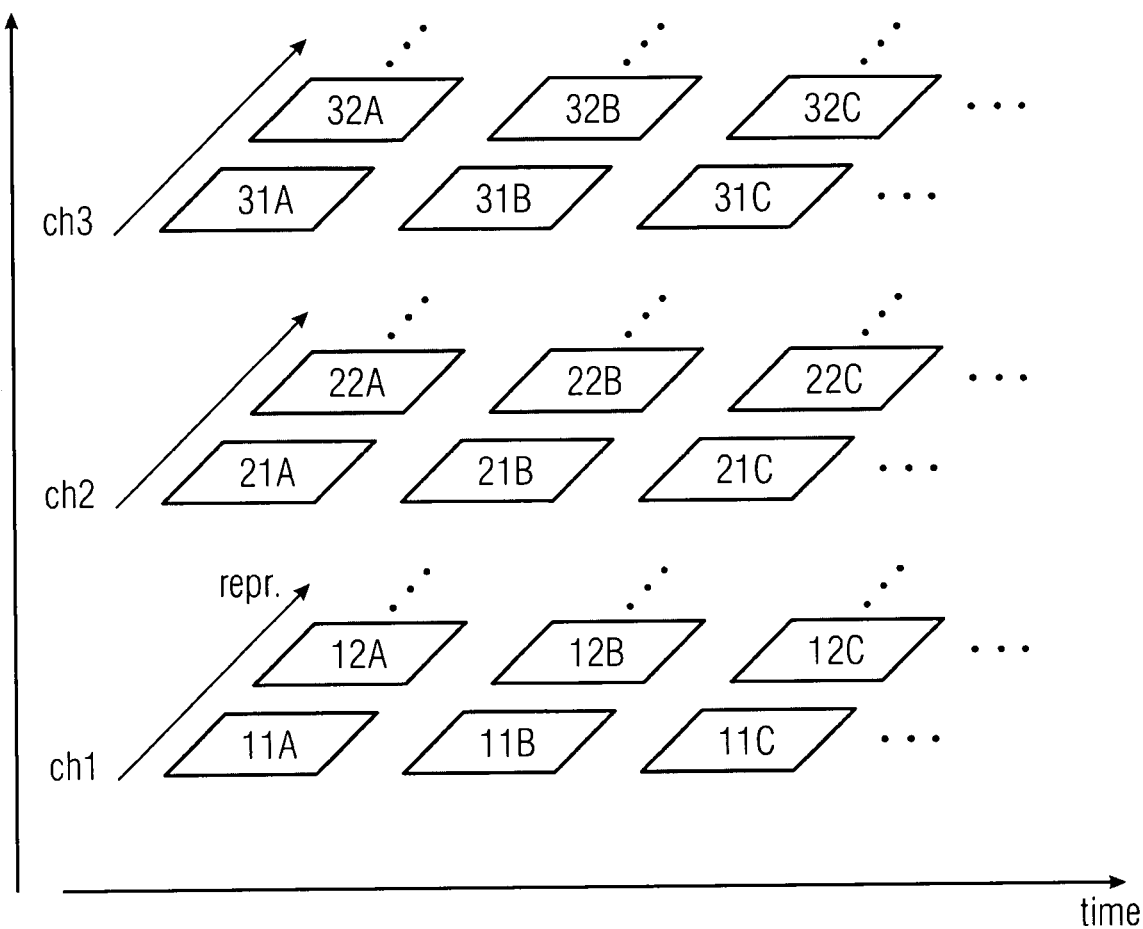
FIG. 20 shows a schematic illustrating a schematic diagram of an output device.
Figure 20:
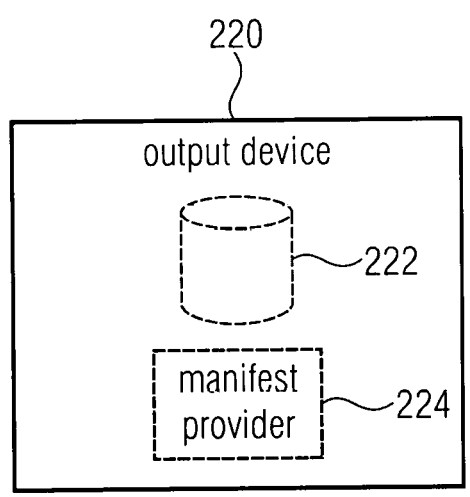

FIG. 20 shows an output device or server 220 which may take advantage of the idea outlined with respect to FIG. 19. The output device 220 may be implemented in hardware, firmware or software as it has been described above with respect to FIGS. 4 and 16. Internally, the output device 220 may comprise a storage 222 and a manifest provider 224. The output device 220 of FIG. 20 is for rendering available for a client, by use of an adaptive streaming protocol, a media scene composed of a plurality of channels. For each of the channels, the output device 220 supports a retrieval or download of the respective channel at one of several representations. In FIG. 20, merely two representations per channel are exemplarily shown with the number of channels being exemplarily three. The number of channels, however, may be any number greater than 1 and the number of representations per channel may likewise be any number greater than 1. For each representation for each channel, the output device 22 offers the output or retrieval of a sequence of segments. In FIG. 20 the segments are denoted using three alphanumeric signs. The first one indicates the channel, the second one indicates the representation and the third one distinguishes between the sequence of segments temporally using capital letters A, B, C . . . . All of these segments are individually retrievable or downloadable by the respective client by a respective request. That is, each segment comprises its own unique address.

The output device 220 describes in the manifest the available media scene, namely in terms of the available representations and their association with the individual channels of the media scene. It should be noted that the representations may be dependent upon each other or may be independent. The channels may correspond to audio channels with the media scene being an audio scene or the channels may be scene sections of a panoramic scene. The individual representations are data streams having the associated channel encoded thereinto, e.g. video streams each having the associated scene section encoded thereinto. The representations belonging to one channel do not need to correspond to different bitrates or the like. The representations belonging to one channel may be of the same bitrate or same quality. However, the output device 220 provides the manifest with information indicating where access points in the individual representations of the various channels are. They are temporally distributed differently from each other. That is, temporal segments comprising a random access point are temporally positioned/distributed differently when compared to representations belonging to one channel. They are distributed in a manner such that temporal segments comprising random access points do not coincide with time between representations belonging to one channel or such coinciding corresponds to a minimum considering the number of temporal segments carrying random access points within these representations of one channel and a number of representations of this channel. For example, the temporal distribution of the random access points is such that, within each representation of each channel, the random access point carrying temporal segments are arranged in a periodic manner every i-th temporal segment at a certain offset j from a beginning of the overall media scene. Within one channel, periodicity i and/or offset j may vary among the representations for the respective channel.

A client device which fits to the embodiment of FIG. 20 may be composed and constructed as the one shown in FIG. 17 so that an extra figure has been left off. The client device 120 would, in accordance with the embodiment fitting to FIG. 20, request the manifest and derive therefrom the positions of the random access points of the various representations belonging to the channels which are, as outlined above, temporally distributed differently when comparing representations belonging to one channel, with this being true for all channels. The client device would then select for each channel for the current temporal segment one of the representations for the respective channel, and this selection would be made depending on the positions of the segments carrying random access points. As outlined above, client device 120 may, for instance, for a fast tune-in select those representations for each channel at a certain temporal segment which allow for a fast tune-in and may, during download of the media scene, select for each temporal segment those representations for each channel, for which the representations show a temporally less varying number of random access point carrying segments.

It is, thus, noted that in accordance with the third aspect, device 200 may be configured for outputting, using an adaptively streaming protocol such as, but not exclusively, DASH, channels of a media scene to a client. The media scene may be a picture and the channels may be sections thereof. Alternatively, the media scene may be an audio scene and the channels may be audio channels. The device 200 may support switching, for each channel, between a set of representations of the respective channel which differ in a temporal distribution of random access points. That is, the device 200 offers such representations to the client for download or for fetching same. The representations belonging to different channels might be coded mutually independent from each other. Representations pertaining the same channel may coded mutually independent from each other or may dependent on each other.

At intermittently occurring time instances, random access points of at least one of the set of representations of the channels may be temporally aligned. See, for example, representation #1, 4, 7 and 10 at the first, $8^{th}$ and $16^{th}$ segment. The corresponding client device 120 for retrieving, using the adaptively streaming protocol, the channels of the media scene may be configured to switch, for each channel, between the set of representations of the respective channel. In doing so, device 120 may be configured to select, for each channel, a representation currently to be retrieve for the respective channel among the set of representations for the respective channel, depending on the temporal distribution of random access points in the set of representations of the channels. The temporal distribution, that is, the temporal positions of the random access points within the various representations, may be agreed between server and client. The device 120 may be configured to retrieve an information revealing the temporal distribution of random access points in the set of representations of the channels from a server from which the media scene is retrieved. In particular, the information may be transported via the manifest sent from the server 200. Alternatively, the information may be conveyed via using hints in predetermined temporal segments of the sets of representations of the channels. The predetermined segments might be the segments of all representations of all channels temporally at intermittently occurring occasions so that irrespective of the currently retrieved representation for each channel, the client obtains the information contained. The information may then be, for example, contained in format file boxes.

It should be noted that server 220 may inform the client on an achievable bitrate peak reduction. The achievable peak bitrate reduction may be one obtained retrieving the media scene by selecting, for each channel, a representation currently to be retrieved for the respective channel among the set of representations for the respective channel, depending on the temporal distribution of random access points in the set of representations of the channels, so that a number of temporal segments among the selected temporal segments which comprise a random access point, temporally varies in a minimum possible manner. Server 220 may inform the client on the achievable peak bitrate reduction in different manners: Server 220 may inform the client on 1) the mean bitrate needed when downloading the media scene, i.e. all channels, at one or more predetermined collections of representations selecting one representation per channel, 2) the bitrate peaks associated with the download of these one or more predetermined collections, and 3) the bitrate peak associated with the download of the media scene when switching between for each channel between the representations thereof in the RAP number variance avoiding manner. Alternative ways would be feasible as well.

The following description is concerned with a fourth aspect of the present application. This aspect is concerned with switching between different representations in an adaptive streaming scenario between client and server. In order to improve the quality of the media stream arriving at the client, a concept presented below suggests the scheduling of a fading phase when switching from one representation to another.

Figure 21:
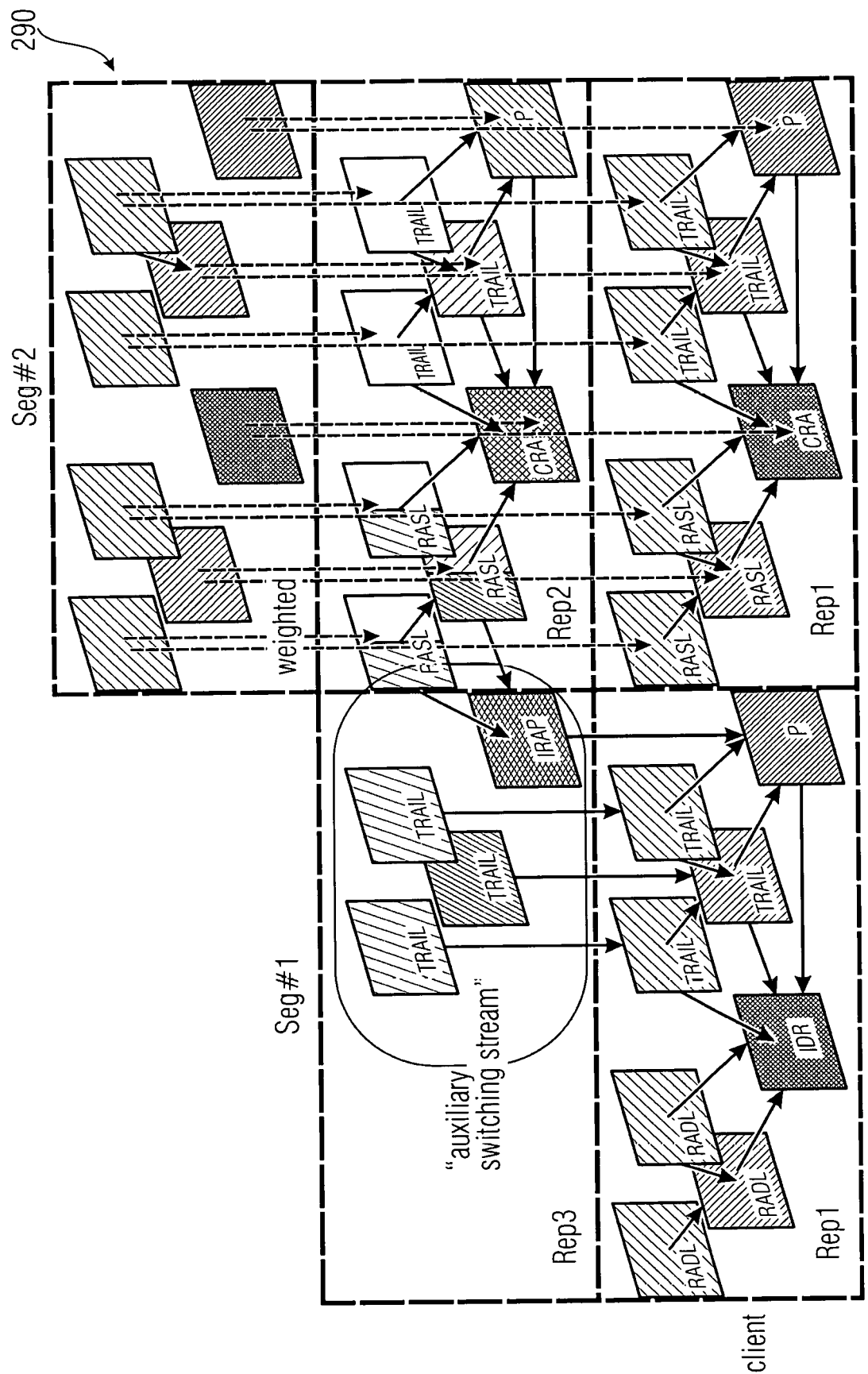
FIG. 21 shows a schematic diagram illustrating the situation of FIG. 13 with additionally offering at the server an auxiliary track for fading purposes to illustrate a fourth aspect of the present application.
Figure 22:
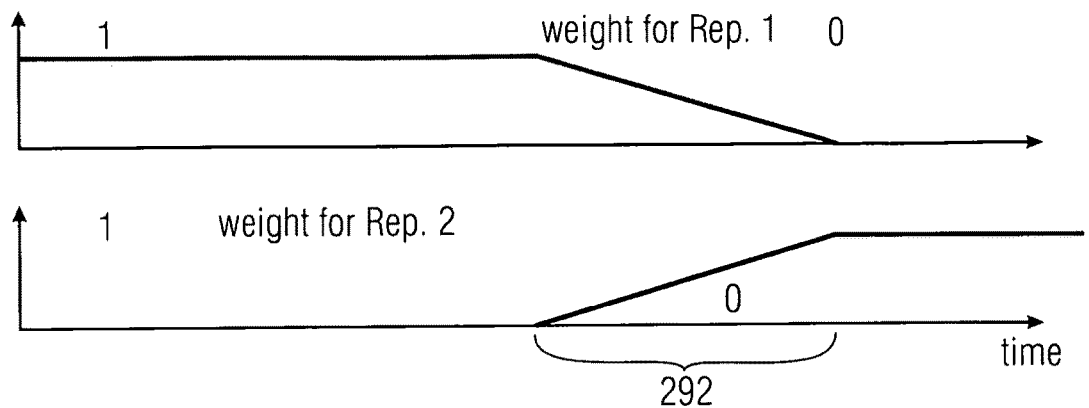
FIG. 22 illustrates two temporal graphs, one upon the other, illustrating the temporal decrease and increase of the factors of the linear combination of predictions on the basis of the first and second representations within the auxiliary track during the fading phase in accordance with an example where the decrease and increase takes place linearly.

FIG. 21 exemplarily shows an example where such a fading phase may advantageously be applied, wherein FIG. 21 exemplarily illustrates the case of combining the present fading phase insertion idea with the transition phase insertion outlined above with respect to the embodiments concerning the first aspect of the present application. That is, FIG. 21 illustrates two consecutive temporal segments as transmitted from server to client upon the respective client's request. FIG. 21 illustratively depicts, as a starting point, the situation of FIG. 13 where the client switches from a first representation in segment Seg #1 to representation 2 in segment Seg #2. In order to compensate for loss of RAM pictures of RAD pictures of representation 2, the client retrieves the auxiliary track in the form of a separate temporal segment in addition to the corresponding temporal segment of the first representation during the temporal segment Seg #1. The video played-out at the client would accordingly transition from the sequence of pictures reconstructed on the basis of the first representation to the pictures of the second representation. However, this transition might lead to degraded presentation quality due to the change from representation 1 to representation 2 while, in the example of FIG. 21 for instance, additionally suffering from the supplementary estimation of the reference pictures of the RASL pictures of the second representation. In order to resolve this deficiency, embodiments of the fourth aspect of the present application suggest offering to the client additional auxiliary track 290, which is a data stream which is bi-predicted on the basis of representation 1 and representation 2 using inter-layer prediction, i.e. with a linear combination of predictors separately derived on the basis of representation 1 and representation 2, respectively. In other words, additional auxiliary track 290 is coded without residual coding by use of inter-layer prediction, namely by, for each picture of additional auxiliary track 290, predicting the respective picture using a copy of a temporally corresponding picture of representation 1 and a copy of a temporally corresponding picture of representation 2 and summing-up both, optionally using weights one of which decreases and the other one of which increases during the phase 292 so that a fading between both representations take place namely from the one to which the decreasing weight belongs to the one to which the increasing weight belongs. In FIG. 21, the inter-layer prediction, in order to derive the separate predictors for each picture of the data stream of the auxiliary track 290, is illustratively depicted using the two dashed arrows leading vertically from a respective picture of the auxiliary track 290 to the temporally corresponding picture of representation 1 and representation 2, respectively. The client thus fetches during a fading phase in addition to segments concerning the second representation the temporally corresponding segments of the auxiliary request 290 and representation 1, and plays out during this fading phase 292 the reconstruction of the auxiliary track 290 in order to then, after the fading phase, proceed with merely retrieving and playing-out the second representation. The pictures of the auxiliary track 290 may, for instance, be coded in bi-predicted form as a linear combination of predictors derived from the pictures of the second representation and the pictures of the first representation, respectively. The linear combination may change, during the fading phase, temporally the weight of the two predictors in such a manner that the pictures of the first representation contribute increasingly less to the linear combination while the pictures of the second representation contribute during the fading phase increasingly more to the linear combination. For example, the pictures of auxiliary track 290 are formed by a linear combination of a first factor times an inter-layer predicted copy of a temporally corresponding picture of the first representation plus a second factor times an inter-layer copied version of a temporally corresponding picture of the second representation, wherein the first factor decreases, during the fading phase, monotonically from 1 to 0, while the second factor increases during the fading phase monotonically from 0 to 1. This is exemplarily depicted in FIG. 22 showing separate graphs for a temporal variation of the first and second factors, respectively, with the curly bracket at the time axis illustrating the fading phase 292.

Figure 23:
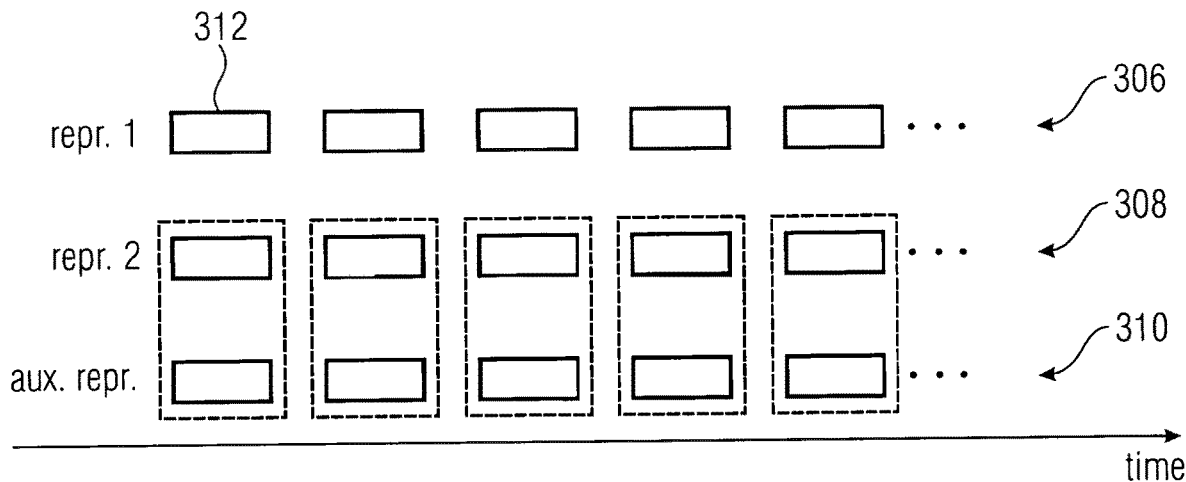
FIG. 23 shows a schematic diagram illustrating an output device in accordance with an embodiment concerning the fourth aspect to the present application.

FIG. 23 shows an output device 300 in a further embodiment using the just outlined fourth aspect. The output device 300 may be implemented and may have an optional internal structure as described with respect to the other output devices of the other aspects of the present application. That is, the output device 300 may be implemented in hardware, firmware or software as outlined above and may internally be composed of a storage 302 and a manifest provider 304.

The output device 300 of FIG. 23 is configured to output, using an adaptive streaming protocol such as, but not exclusively, DASH, a media content such as, but not exclusively, a video. The device 300 offers the media content to the client for retrieval in the form of, at least, first media stream 306 having encoded therein the media content at a first quality, a second media stream 308 having encoded therein the media content at a second quality and an auxiliary media stream 310 having encoded therein the media content dependent on the first and second media streams 306 and 308. Thus, the first media stream 306 forms a first representation of the media content and the second media stream 308 forms a second representation. The second representation may or may not be dependent on the first representation. The media streams 306 to 310 are depicted, respectively, as a sequence of temporal segments 312 with temporal segments 312 of the auxiliary media stream 310 being separately retrievable by the client from output device 300 from temporal segments 312 of media streams 306 and 308, but illustrated using dashed boxes, the auxiliary media stream 310 may alternatively be included within temporal segments of the second media stream 308 with this option being illustrated in 24, or within the temporal segments of the first media stream 306. A manifest which manifest provider 304 would output to the client upon a respective client request, for example, would describe representations 1 and 2 such as the needed decoding capability to decode the respective representation, a quality thereof, the transmission bitrate thereof and the like. Additionally, the manifest would provide a client with one or more segment templates for computing the addresses for fetching the temporal segments 312 which addresses would be different for temporal segments of media stream 306 on the one hand and media stream 308 on the other hand with the auxiliary media stream 310 being included in these temporal segments, or the one or more segment templates with a result into a computation of separate addresses for fetching temporal segments of streams 306, 308 and 310 separately.

Figure 24:
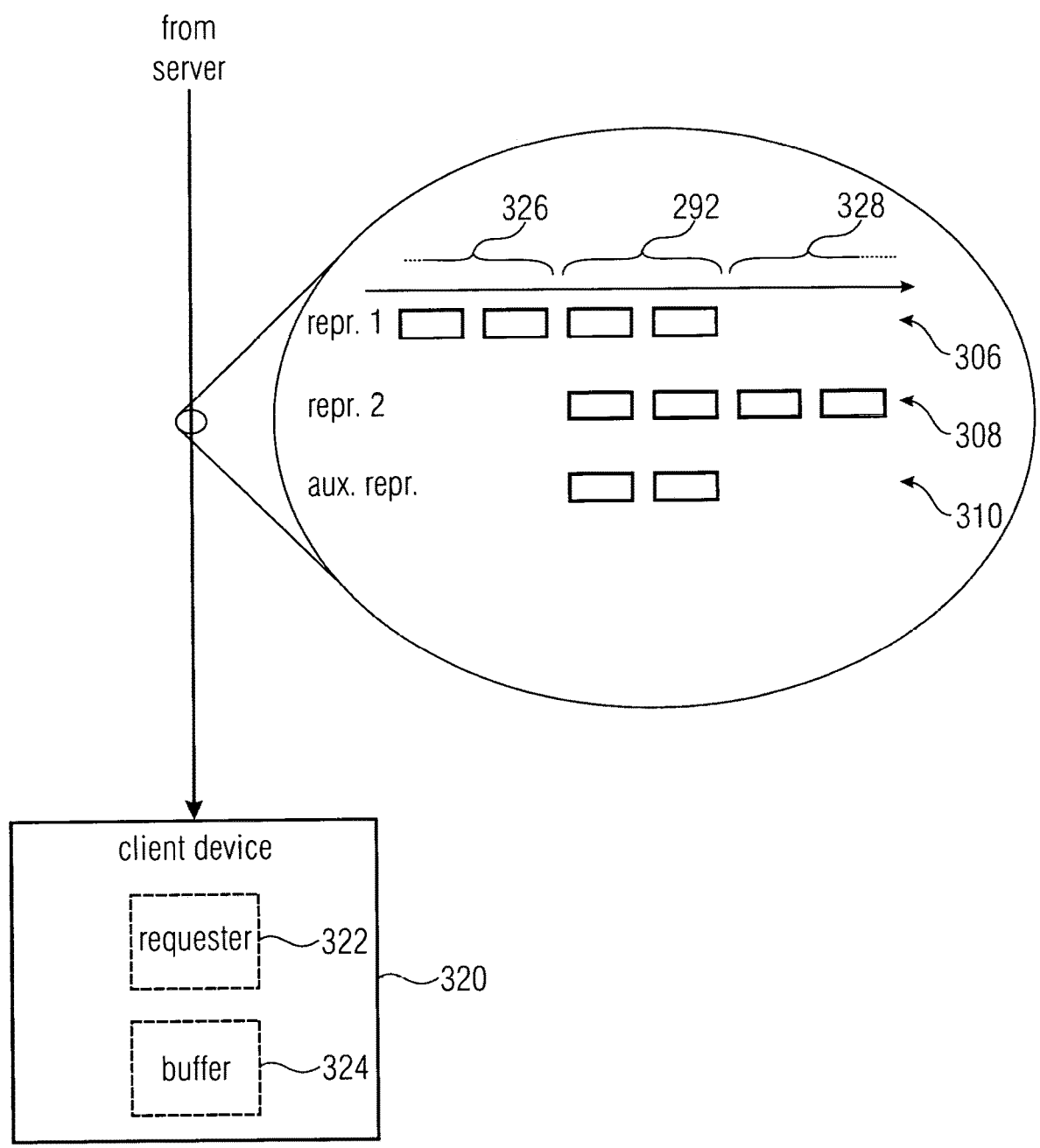
FIG. 24 shows a schematic diagram illustrating a client device in accordance with an embodiment concerning the fourth aspect of the present application.

The client device 320 of FIG. 24 may be implemented in the same manner as described above with respect to the other client devices with regard to the implementation in the form of hardware, firmware or software and with respect to the internal structure according to which client device 320 may optionally comprise a requester 322 and a buffer 324. The client device of FIG. 24 is configured to retrieve, using an adaptive streaming protocol such as, but not exclusively, DASH, a media content such as, but not exclusively, a video, from a server and supports, to this end, switching between, at least, retrieving the first media stream or the second media stream from a server such as the output device of FIG. 23. The client device is configured to schedule a fading phase 292 at switching from retrieving the first media stream to retrieving the second media stream within which the device 320 retrieves the auxiliary media stream with first and second media streams and plays-out the auxiliary media stream instead of the second auxiliary stream. For example, FIG. 24 illustrates the case of the second representation 308 being independent from the first representation so that the client device 320 during the time phase 326 preceding the fading phase, merely fetches, segments of, or retrieves, the first media stream 306 from the server and subject same to decoding by a respective decoder. During the fading phase 292 client device 320 fetches temporal segments within the fading phase 292 of the auxiliary media stream 310 along with the temporally corresponding temporal segments of media streams 306 and 308 and subjects them all to decoding by a corresponding decoder while in a temporal phase 328 succeeding the fading phase 292, client device 320 refrains from retrieving the auxiliary media stream 310 with playing-out and retrieving from the server, the second media stream 308. If the second representation would be a representation dependent on the first representation, client device 320 would retrieve the temporal segments of second media stream 308 during temporal phase 328 along with the temporally corresponding segments of media stream 306.

Figure 25:
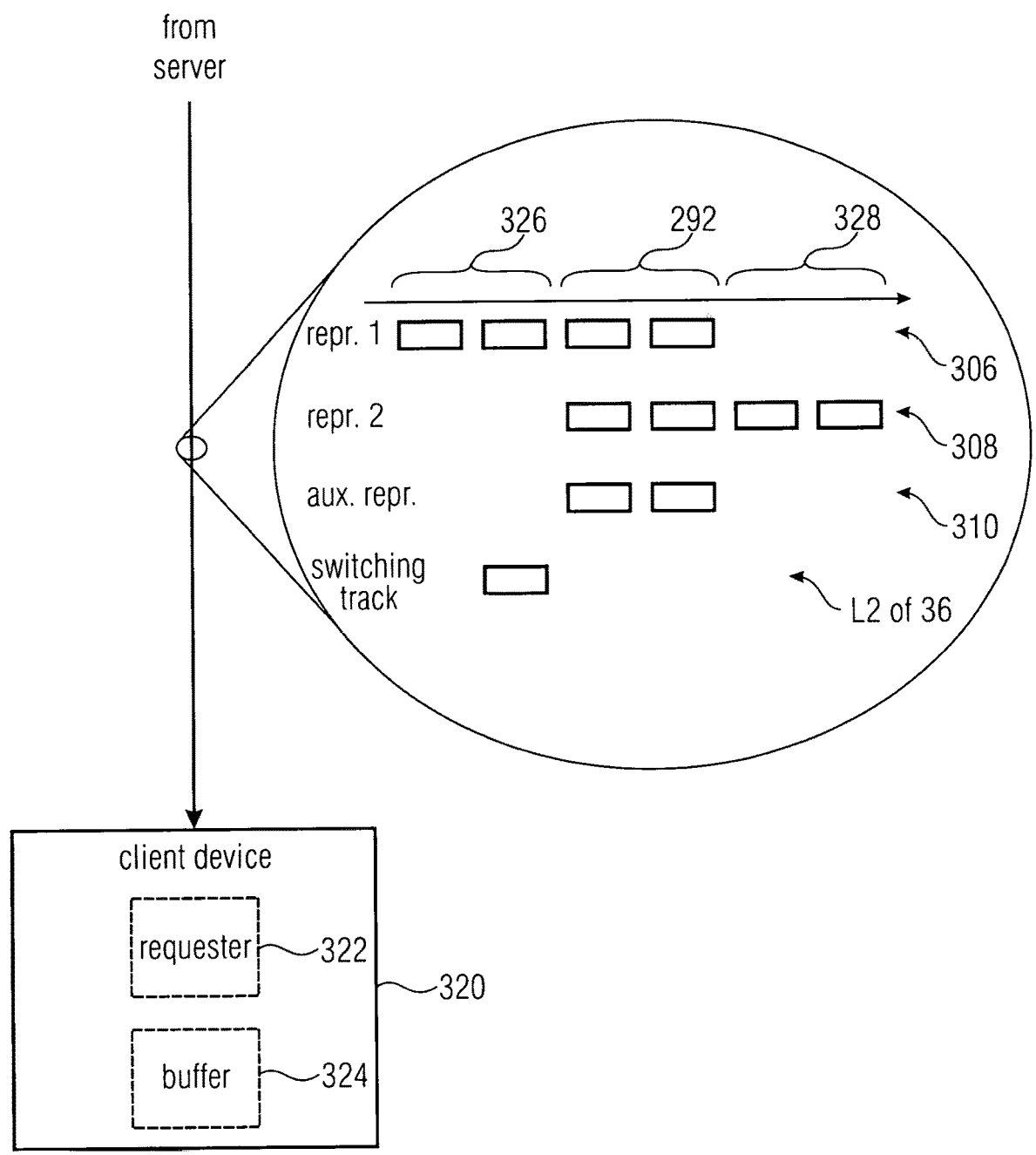
FIG. 25 shows a schematic diagram illustrating a client device modified compared to FIG. 25 in that the client device also operates in accordance with a first aspect of the present application.

As already noted above, the embodiments described above with respect to the first aspect of the present application and the embodiments described with respect to the fourth aspect of the present application may be combined. FIG. 25, for instance, shows the client device 320 as interacting with a server which, in addition to the first, second and auxiliary representations 306, 308 and 310 offers the media content, here namely a video, for retrieval in the form of a switching track L2 of 36. The client device 320 is accordingly configured to schedule both transition phase 84 and fading phase 292 at a transition from representation 1 to representation 2. During the transition phase 84, client device 320 would retrieve from the server the switching track, namely the second layer L2 of layered video stream 36 in addition to the first media stream 306 which would then correspond to layer L1 of layered video stream 36, either in separate temporal segments or common temporal segments, with then transitioning to the fading phase where client device 320 does not play-out the switching track L2 of 36 as done during the transition phase 84, but the auxiliary representation as derived from the auxiliary media stream 310 coded dependent on media streams 306 and 308, respectively.

In other words, according to an embodiment, a superimposed signal is displayed with the output signal being a weighted version of multiple tracks; some of the tracks may be upsampled prior to superposition; one such weighting switches between the two tracks at a specified point; another weighting allows for a gradual transition from one track to the other. A superimposed signal may be displayed with the output signal being a weighted version of both tracks;

one of the tracks contains the video at a higher quality (e.g. higher resolution or higher fidelity to original), potentially also coding drift affected prior to superposition (e.g. if open GOP encoding was used);

one such weighting allows for a gradual transition from one track to the other the superposition is realized outside the codec domain.

the superposition is realized within the codec domain following the figure below, in which a third "layer" indicated as additional representation "weighted" is played out featuring a mere weighted prediction from Rep 1 and Rep 2 (dashed orange arrows).

Even in the absence of (drift affected or not) open GOP like coded leading pictures, the method allow for (gradual) layer switching.

With respect to the latter embodiments, it is noted that an alternative embodiment involves the device 300 providing the client with meta data controlling a fading at the client when switching between the first and second media streams. The meta data could describe, for example, the strength of increase/decrease of the afore-mentioned weights to be used in fading. The client device 120 would receive meta data from the server and control, using the meta data, a fading when switching between the first and second media streams.

With respect to the above description, it is noted that any encoder, decoder or network device shown may be embodied or implemented in hardware, firmware or software. When implemented in hardware, the respective encoder, decoder or network device may, for instance, be implemented in the form of an application specific integrated circuit. If implemented in firmware, the respective device may be implemented as a field programmable array, and if implemented in software, the respective device may be a processor or computer programmed to perform the described functionality.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded data stream or signal can be stored on a digital storage medium or can be transmitted on a transmission medium such as a wireless transmission medium or a wired transmission medium such as the Internet. Where ever the insertion or encoding of some information into a data stream has been described, this description is concurrently to be understood as a disclosure that the resulting data stream comprises the respective information, syntax element of flag or so forth.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Device for retrieving, using an adaptively streaming protocol, a video, the device supporting switching between, at least,
   retrieving the video in form of a first video stream; and
   retrieving the video in form of a second video stream,
   wherein the device is configured to schedule a transition phase before switching from retrieving the video in form of the first video stream to retrieving the video in form of the second video stream, and
   wherein the second video stream is encoded using an open GOP structure and the device is configured to subject the first video stream and second video stream in a manner spliced together to decoding such that pictures decoded from a first video stream form, for random access dependent pictures of the second video stream which respectively directly or indirectly reference, by temporal prediction, a, in terms of presentation time order, succeeding random access point picture of the second video stream and a reference picture preceding, in terms of presentation time order and decoding order, the random access point picture, a substitute of the reference picture.

2. Device according to claim 1, wherein the first video stream is a layered video stream comprising
   a first layer having encoded thereinto the video at a first spatial resolution and
   a second layer having encoded thereinto the video at a second spatial resolution greater than the first spatial resolution and using inter-layer prediction from the first to the second layer by way of inter-layer upsampling, but without residual coding.

3. Device according to claim 2, wherein the device is configured to retrieve the layered video stream in temporal segments comprising the first and second layers.

4. Device according to claim 3, wherein the device is configured to restrict subjecting the second layer to decoding along with the first layer to a time during the transition phase.

5. Device according to claim 2, wherein the device is configured to retrieve the layered video stream in temporal segments separately comprising the first and second layers.

6. Device according to claim 5, wherein the device is configured to refrain from retrieving temporal segments comprising the second layer outside the transition phase.

7. Device according to claim 2, wherein the second video stream is a further layered video stream comprising a further second layer having encoded thereinto the video at the second spatial resolution without inter-layer prediction,
   wherein the device is configured to, in the transition phase, submitting the first and second layers to decoding by a scalable video decoder and, immediately after the transition phase, submit the further layered video stream to decoding by the scalable video decoder so that the scalable video decoder acquires from the second layer of the layered video stream for random access dependent pictures of the second spatial resolution of the further layered video stream which respectively directly or indirectly reference, by temporal prediction, a, in terms of presentation time order, succeeding random access point picture of the further layered video stream and a reference picture preceding, in terms of presentation time order and decoding order, the random access point picture, a substitute for the reference picture.

8. Device according to claim 7 wherein the first layer is encoded using a closed GOP structure,
wherein the device is configured to, when switching from retrieving the video in form of the second video stream to retrieving the video in form of the first video stream,
immediately consecutively submit to the scalable video decoder a portion of the further layered video stream pertaining a first portion of the video so as to retrieve the first portion of the video at the second spatial resolution followed by the first layer of a second portion of the layered video stream pertaining a second portion of the video, immediately following the first portion, so as to retrieve the second portion of the video at the first spatial resolution.

9. Device according to claim 1, configured to acquire from a server from which the video is retrieved, an information of a length of the transition phase.

10. Device according to claim 9, configured to request from the server a manifest describing an availability of the video for a client at the server in form of the first video stream and in the second video stream and acquire the information on the length of the transition phase or the signalization from the manifest.

11. Device according to claim 1, configured to acquire from a server from which the video is retrieved, a signalization and, depending on the signalization, deactivate the scheduling or activate the scheduling.

12. Device for outputting, using an adaptively streaming protocol, a video to a client, the device being configured to offer the video to the client for retrieval in form of, at least,
a first video stream; and
a second video stream,
wherein the device is configured to inform the client on the necessity to schedule a transition phase before switching from retrieving the video in form of the first video stream to retrieving the video in form of the second video stream, and
wherein the second video stream is encoded using an open GOP structure and the device is configured to subject the first video stream and second video stream in a manner spliced together to decoding such that pictures decoded from a first video stream form, for random access dependent pictures of the second video stream which respectively directly or indirectly reference, by temporal prediction, a, in terms of presentation time order, succeeding random access point picture of the second video stream and a reference picture preceding, in terms of presentation time order and decoding order, the random access point picture, a substitute of the reference picture.

13. Device according to claim 12, wherein
the device is configured to provide the client with a manifest
describing an availability of the video for the client in a first spatial resolution in form of the first video stream and in a second spatial resolution, higher than the first spatial resolution, in form of the second video stream and
indicating a presence of a second layer in temporal segments of the first video stream and a purpose of the second layer to be played-out when switching from the first spatial resolution to the second spatial resolution during the transition phase before switching to the second video stream;
indicating a computational rule to compute addresses for fetching temporal segments of the first video stream and the second video stream, respectively.

14. Device according to claim 13, wherein the device is configured to offer the video to the client for retrieval additionally in form of a further video stream with the manifest describing the availability of the video for the client in a third spatial resolution, higher than the first and second spatial resolutions, in form of the further video stream, and to inform the client on
down-switching occasions for switching from the third to the second spatial resolution and
up-switching occasions for switching from the first or third video stream to the second video stream.

15. Device according to claim 13, wherein the device indicates in the manifest that the first video stream and the second video stream may be spliced together so as to be fed to one decoder.

16. Device according to claim 12, wherein the device is configured to offer the video to the client for retrieval additionally in form of a third video stream, and
the device is configured to provide the client with a manifest
describing an availability of the video for the client in a first spatial resolution in form of a third video stream, and in a second spatial resolution, higher than the first spatial resolution, in form of the second video stream and
indicating that temporal segments of the first video stream are to be retrieved during the transition phase along with temporal segments of the third video stream when switching from the first spatial resolution to the second spatial resolution between switching from the third video stream via the first video stream to the second video stream;
indicating a computational rule to compute addresses for fetching temporal segments of the first, second and third video streams.

17. Device according to claim 12, wherein the device informs the client on a length of the transition phase.

18. Method for retrieving, using an adaptively streaming protocol, a video, the method comprising switching between, at least,
retrieving the video in form of a first video stream; and
retrieving the video in form of a second video stream,
wherein a device is configured to schedule a transition phase before switching from retrieving the video in form of the first video stream to retrieving the video in form of the second video stream, and
wherein the second video stream is encoded using an open GOP structure and the device is configured to subject the first video stream and second video stream in a manner spliced together to decoding such that pictures decoded from a first video stream form, for random access dependent pictures of the second video stream which respectively directly or indirectly reference, by temporal prediction, a, in terms of presentation time order, succeeding random access point picture of the second video stream and a reference picture preceding, in terms of presentation time order and decoding order, the random access point picture, a substitute of the reference picture.

19. Method for outputting, using an adaptively streaming protocol, a video to a client, the method comprising offering the video to the client for retrieval in form of, at least, a first video stream; and a second video stream, and informing the client on the necessity to schedule a transition phase before switching from retrieving the video in form of the first video stream to retrieving the video in form of the second video stream, and wherein the second video stream is encoded using an open GOP structure, and the first video stream and second video stream are subject, in a manner spliced together, to decoding such that pictures decoded from a first video stream form, for random access dependent pictures of the second video stream which respectively directly or indirectly reference, by temporal prediction, a, in terms of presentation time order, succeeding random access point picture of the second video stream and a reference picture preceding, in terms of presentation time order and decoding order, the random access point picture, a substitute of the reference picture.

* * * * *